(12) United States Patent
Caveney

(10) Patent No.: US 7,770,852 B2
(45) Date of Patent: Aug. 10, 2010

(54) STACKABLE MOUNT ASSEMBLY INCLUDING INDEXING/LOCKING FEATURES

(75) Inventor: Jack E. Caveney, Hinsdale, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 12/242,155

(22) Filed: Sep. 30, 2008

(65) Prior Publication Data

US 2009/0101765 A1    Apr. 23, 2009

Related U.S. Application Data

(60) Provisional application No. 60/977,930, filed on Oct. 5, 2007.

(51) Int. Cl.
*F16L 3/22* (2006.01)
(52) U.S. Cl. ...................... 248/68.1; 411/401
(58) Field of Classification Search ............... 248/68.1, 248/49, 69, 74.3; 403/97, 101; 411/396, 411/400, 401, 389
See application file for complete search history.

(56) References Cited

U.S. PATENT DOCUMENTS

| | | | |
|---|---|---|---|
| 1,062,015 A | 5/1913 | Lane | |
| 3,172,071 A | 3/1965 | Ihrig | |
| 3,250,505 A | 5/1966 | Rodman, Sr. et al. | |
| 3,630,252 A | 12/1971 | Rosan, Sr. | |
| 3,633,605 A | 1/1972 | Smith | |
| 3,711,226 A | 1/1973 | Kreuter | |
| 4,467,988 A | 8/1984 | Kraus | |
| 4,534,471 A | 8/1985 | Zahn et al. | |
| 4,547,092 A * | 10/1985 | Vetter et al. | 403/59 |
| 4,562,982 A | 1/1986 | McSherry et al. | |
| 4,763,855 A | 8/1988 | DiVincenzo | |
| 4,859,129 A | 8/1989 | Kraus | |
| 4,905,942 A | 3/1990 | Moretti | |
| 4,917,343 A * | 4/1990 | Wainscott | 248/447.2 |
| 4,960,253 A * | 10/1990 | Perrault et al. | 248/68.1 |
| 5,052,842 A * | 10/1991 | Janatka | 403/14 |
| 5,098,241 A | 3/1992 | Aldridge et al. | |
| 5,238,152 A | 8/1993 | Maas et al. | |
| 5,288,161 A | 2/1994 | Graves et al. | |
| 5,379,566 A | 1/1995 | Schwörer | |

(Continued)

FOREIGN PATENT DOCUMENTS

GB    1480915    7/1977

OTHER PUBLICATIONS

Nylon Molding Corporation's Ring Posts Brochure, 3 pages, date unknown.

*Primary Examiner*—Ramon O Ramirez
(74) *Attorney, Agent, or Firm*—Robert A. McCann; Christopher S. Clancy; James H. Williams

(57) ABSTRACT

Certain embodiments of the present invention provide a stackable mount assembly that includes indexing and/or locking features. The stackable mount assembly includes a plurality of mounts. Each mount includes a hub and a fastener. Indexing features prevent the hub from freely rotating about the fastener, but allow the hub to index or rotate about the fastener at an index angle. The locking features prevent the hub from rotating about the fastener, locking the hub in a desired position and/or orientation.

20 Claims, 23 Drawing Sheets

U.S. PATENT DOCUMENTS

| | | |
|---|---|---|
| 5,505,411 A | 4/1996 | Heaton et al. |
| 5,520,474 A * | 5/1996 | Liu .................... 403/97 |
| 5,538,208 A | 7/1996 | Cordes et al. |
| 5,547,305 A * | 8/1996 | Treche .................. 403/97 |
| D379,424 S | 5/1997 | White, Jr. et al. |
| 5,653,409 A | 8/1997 | White, Jr. et al. |
| 5,692,856 A | 12/1997 | Newman, Jr. et al. |
| 5,730,399 A | 3/1998 | Baginski |
| 6,129,317 A | 10/2000 | Rodrigues et al. |
| 6,196,751 B1 | 3/2001 | Khokhar |
| 6,409,411 B1 * | 6/2002 | Crorey .................. 403/97 |
| 6,575,536 B2 | 6/2003 | Chen |
| 6,598,837 B1 * | 7/2003 | Howard et al. ............. 248/103 |
| 6,709,188 B2 | 3/2004 | Ushimaru |
| D496,851 S | 10/2004 | Stephen et al. |
| D497,100 S | 10/2004 | Stephen et al. |
| 6,880,787 B2 | 4/2005 | Stephen et al. |
| 6,880,788 B2 | 4/2005 | Stephen |
| 6,884,014 B2 | 4/2005 | Stone et al. |
| 7,373,861 B2 * | 5/2008 | Hsieh .................. 81/177.9 |
| 2003/0171753 A1 | 9/2003 | Collins et al. |
| 2004/0021042 A1 | 2/2004 | Stephen et al. |
| 2004/0206855 A1 | 10/2004 | Caveney et al. |

* cited by examiner

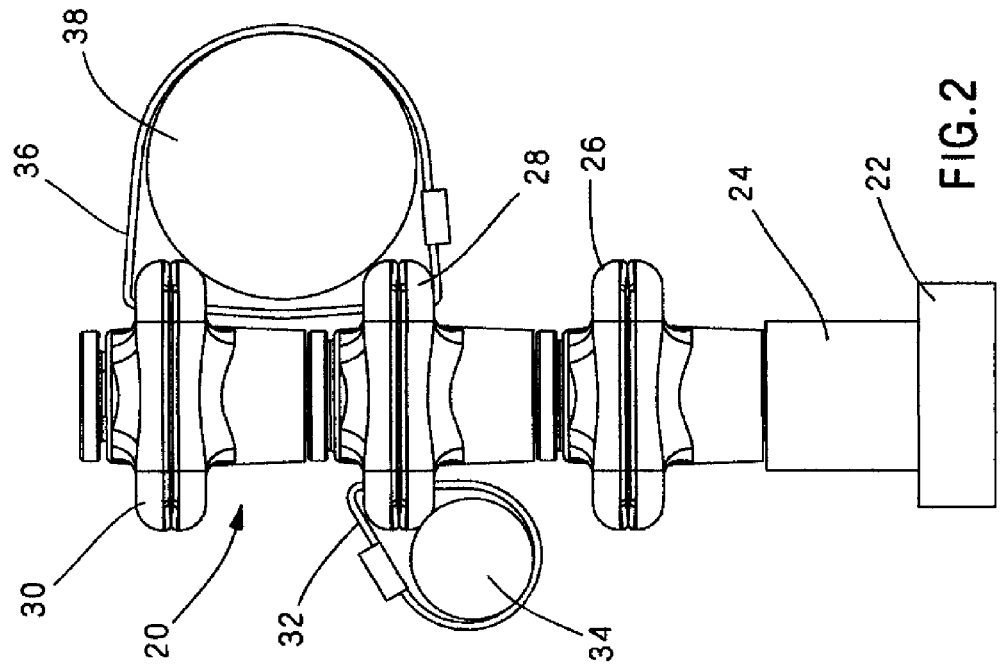
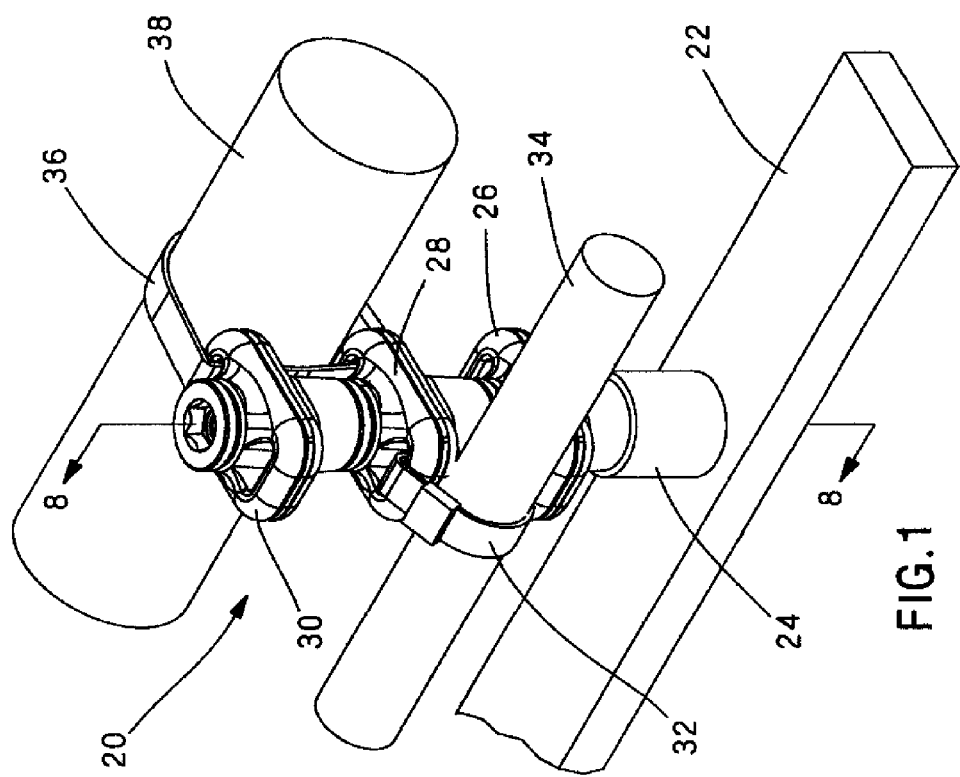

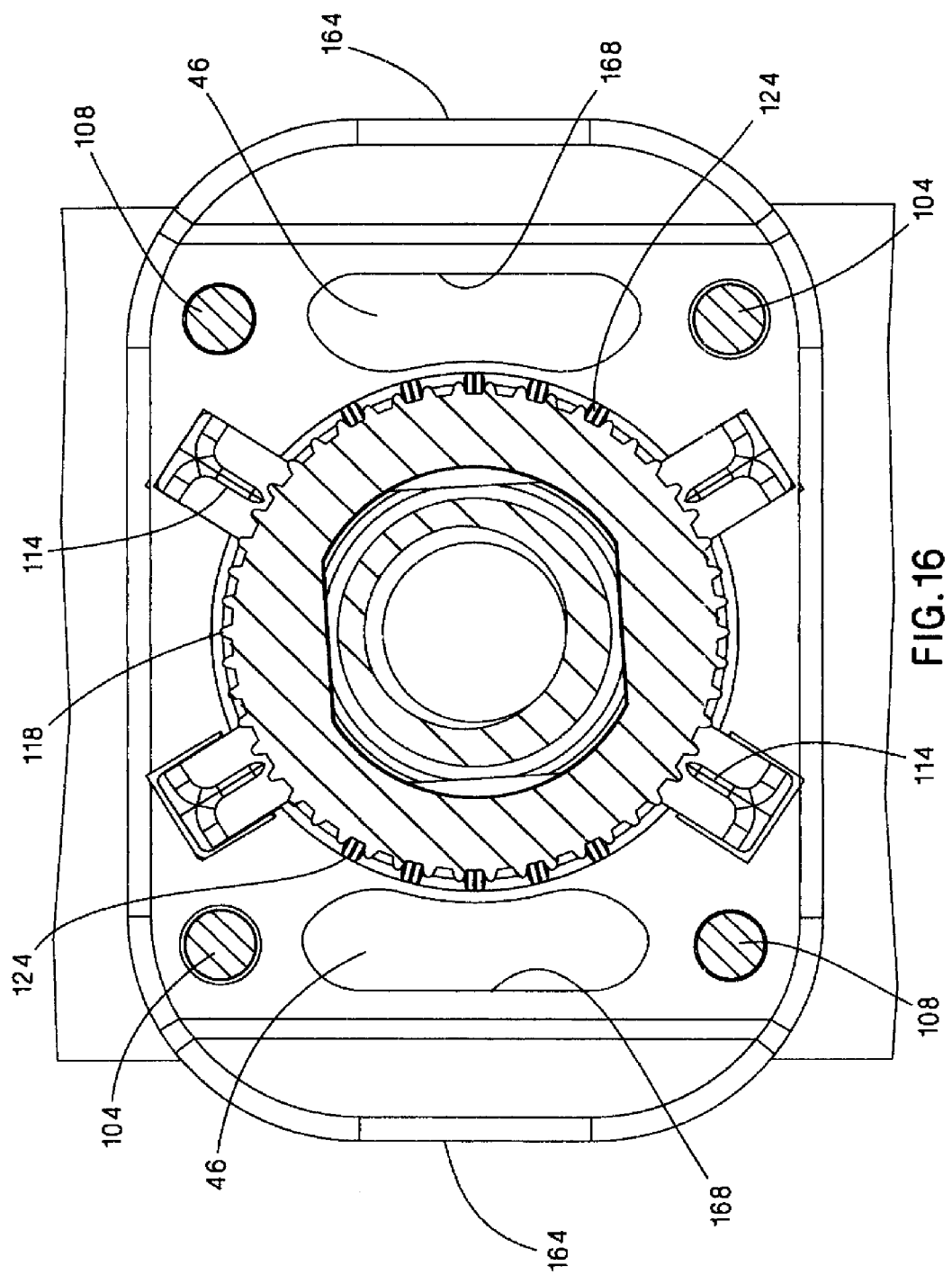

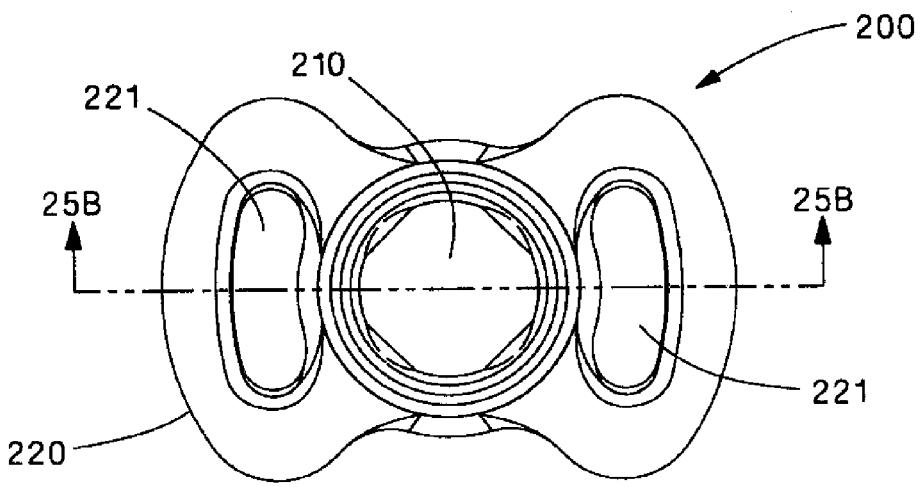
FIG.25A
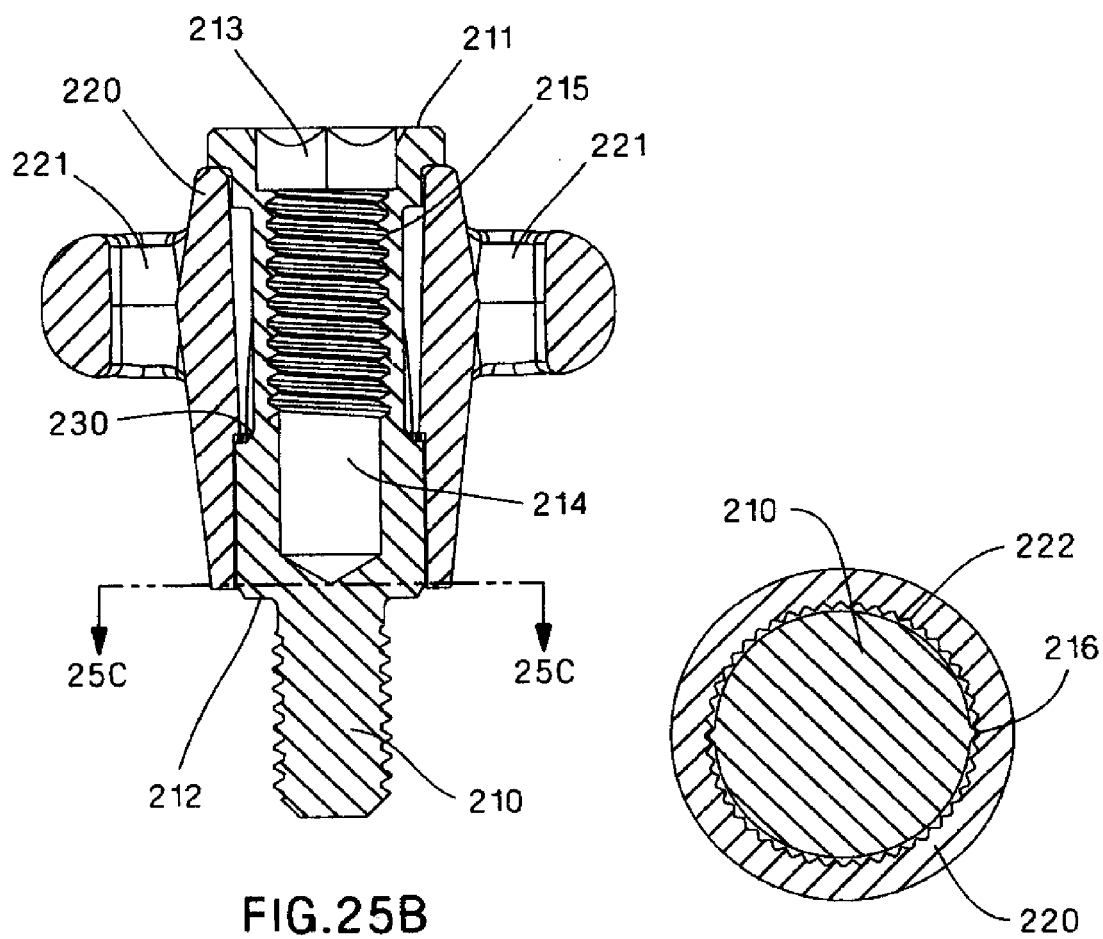
FIG.25B
FIG.25C

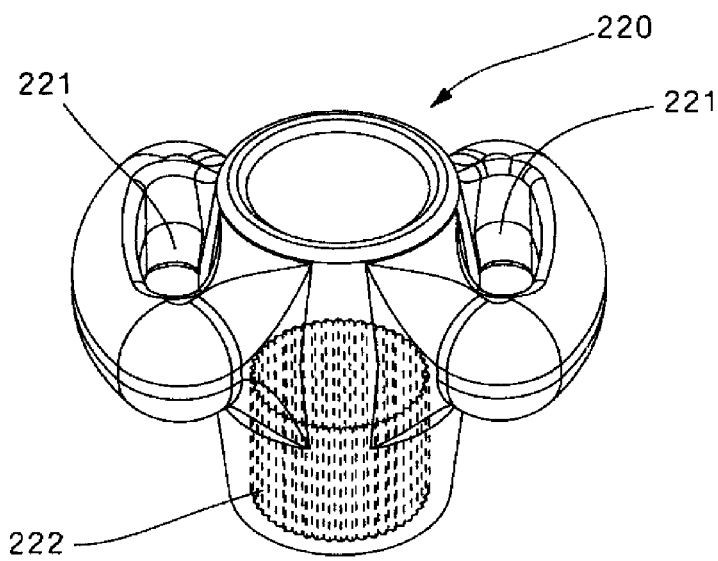
FIG.26A
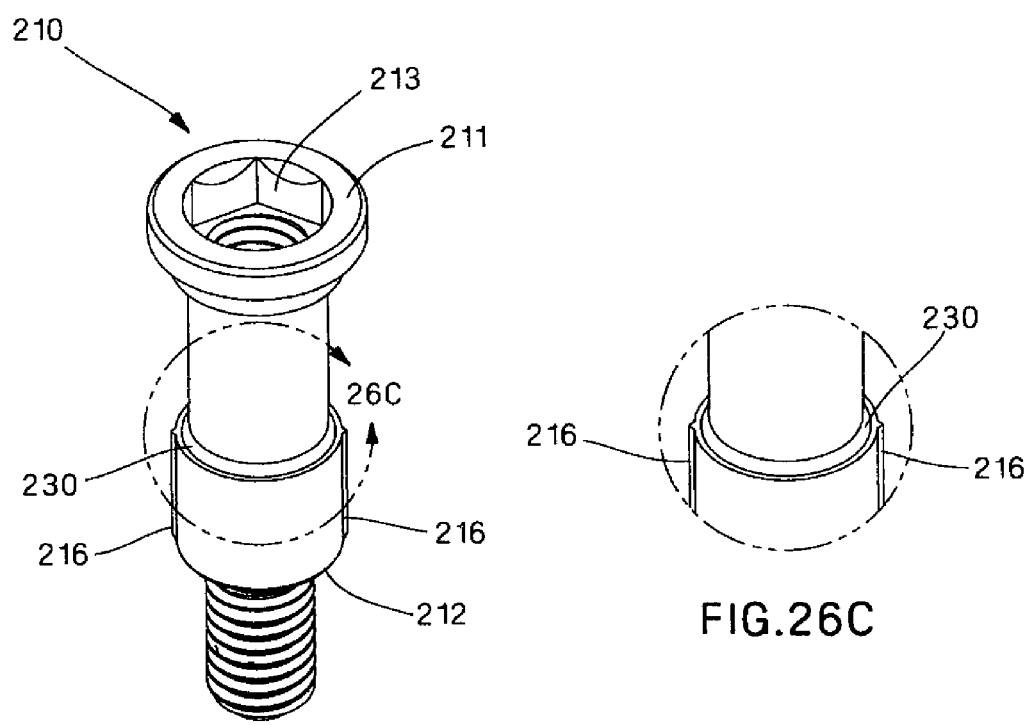
FIG.26B
FIG.26C

STACKABLE MOUNT ASSEMBLY INCLUDING INDEXING/LOCKING FEATURES

CROSS-REFERENCE TO RELATED APPLICATION

The present invention claims priority to U.S. Provisional Patent Application No. 60/977,930, filed Oct. 5, 2007, the contents of which are hereby incorporated by reference in its entirety.

BACKGROUND OF THE INVENTION

The present invention relates to a stackable mount assembly. More particularly, the present invention relates to a stackable mount assembly including indexing and/or locking features.

Ringposts have been utilized for wire bundle management in aircraft. For example, Nylon Molding Corporation's RP series ringposts, described in U.S. Pat. Nos. 6,880,787 and 6,880,788, and U.S. Design Pat. Nos. D496,851 and D497,100, may provide one to six levels of wiring on one rack or support structure, and may accommodate bundles up to 1¼ inch in diameter. The RP1700 ringpost includes a single ringpost without a screw. The RP1703 and RP1704 ringposts include a standard size hex head screw insert molded into a single and double ringpost, respectively, along with a steel socket which is also insert molded. As another example, U.S. Patent Application Publication No. 2004/0206855 A1, assigned to Panduit Corporation, describes a ringpost that allows a hub to freely rotate about a fastener after the ringpost has been torqued down into a mounting structure. However, none of the prior art describes a stackable mount assembly including indexing and/or locking features.

Therefore, there is a need for a stackable mount assembly including indexing and/or locking features.

SUMMARY OF THE INVENTION

Certain embodiments of the present invention provide a hub assembly for a stackable mount. The hub assembly includes a sleeve and at least one rung component. The rung component is rotatably connected to the sleeve.

In certain embodiments of the present invention, the sleeve includes a first set of indexing teeth and the at least one rung component includes a second set of indexing teeth. The first set of indexing teeth and the second set of indexing teeth engage to allow the at least one rung component to indexically rotate about the sleeve at a desired angle of rotation.

In certain embodiments of the present invention, the sleeve includes a first set of locking teeth and the at least one rung component includes a second set of locking teeth. The first set of locking teeth and the second set of locking teeth engage to lock the at least one rung component in a desired position and prevent further rotation of the at least one rung component about the sleeve.

Certain embodiments of the present invention provide a stackable mount for a stackable mount assembly. The stackable mount includes a fastener and a hub. The hub is rotatably connected to the fastener. The fastener includes at least one rib. The hub includes a plurality of slots. The at least one rib and the plurality of slots engage to allow the hub to indexically rotate about the fastener at a desired angle of rotation.

BRIEF DESCRIPTION OF THE FIGURES

FIG. 1 is a top front perspective view of a stackable mount assembly of the present invention, shown having two cable ties for securing various size wire bundles therein.

FIG. 2 is a side elevational view of the stackable mount assembly of FIG. 1.

FIG. 16 is a cross-sectional view taken along lines 16-16 of FIG. 10.

FIGS. 25A-C and 26A-C illustrate a mount according to an alternative embodiment of the present invention.

DETAILED DESCRIPTION OF THE PREFERRED EMBODIMENTS

Figure 3:
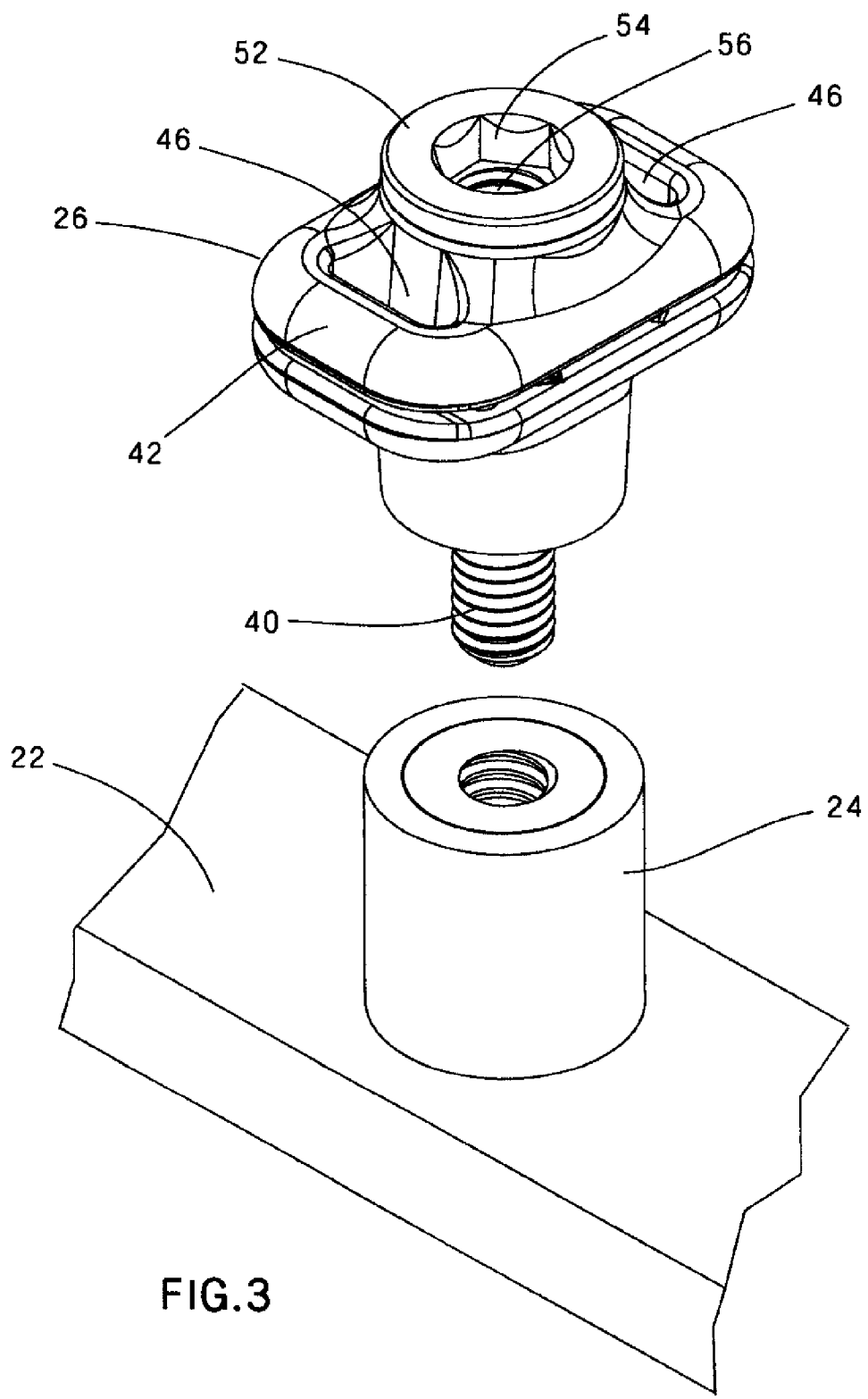
FIG. 3 is a top front perspective view of the first mount utilized in the stackable mount assembly of FIG. 1.

The illustrated embodiments of the present invention are directed to a stackable mount assembly that includes indexing and/or locking features.

FIGS. 1-2 show a fully assembled stackable mount assembly 20. The stackable mount assembly 20 includes a mounting structure 22 having a base 24, a first mount 26, a second mount 28, a third mount 30, a first cable tie 32, a first wire bundle 34, a second cable tie 36, and a second wire bundle 38. Preferably, the first mount 26, the second mount 28, and the third mount 30 are substantially identical. It is likewise contemplated that the stackable mount assembly 20 may include any number of stackable mounts.

As best seen in FIG. 2, the first cable tie 32 secures the first wire bundle 34 to one rung of the second mount 28, and the second cable tie 36 secures the second wire bundle 38 to one rung of the second mount 28 and one rung of the third mount 30. Preferably, when securing large wire bundles to the stackable mount assembly 20, the cable tie should pass through one rung on each of two adjacent mounts. Moreover, when securing small wire bundles to the stackable mount assembly 20, the cable tie should only pass through one rung on one mount. Therefore, as shown in FIGS. 1-2, the first wire bundle 34 is an example of a small wire bundle, and the second wire bundle 38 is an example of a large wire bundle. It is likewise contemplated that stackable mount assembly 20 may include any number of cable ties and wire bundles.

Figure 4:
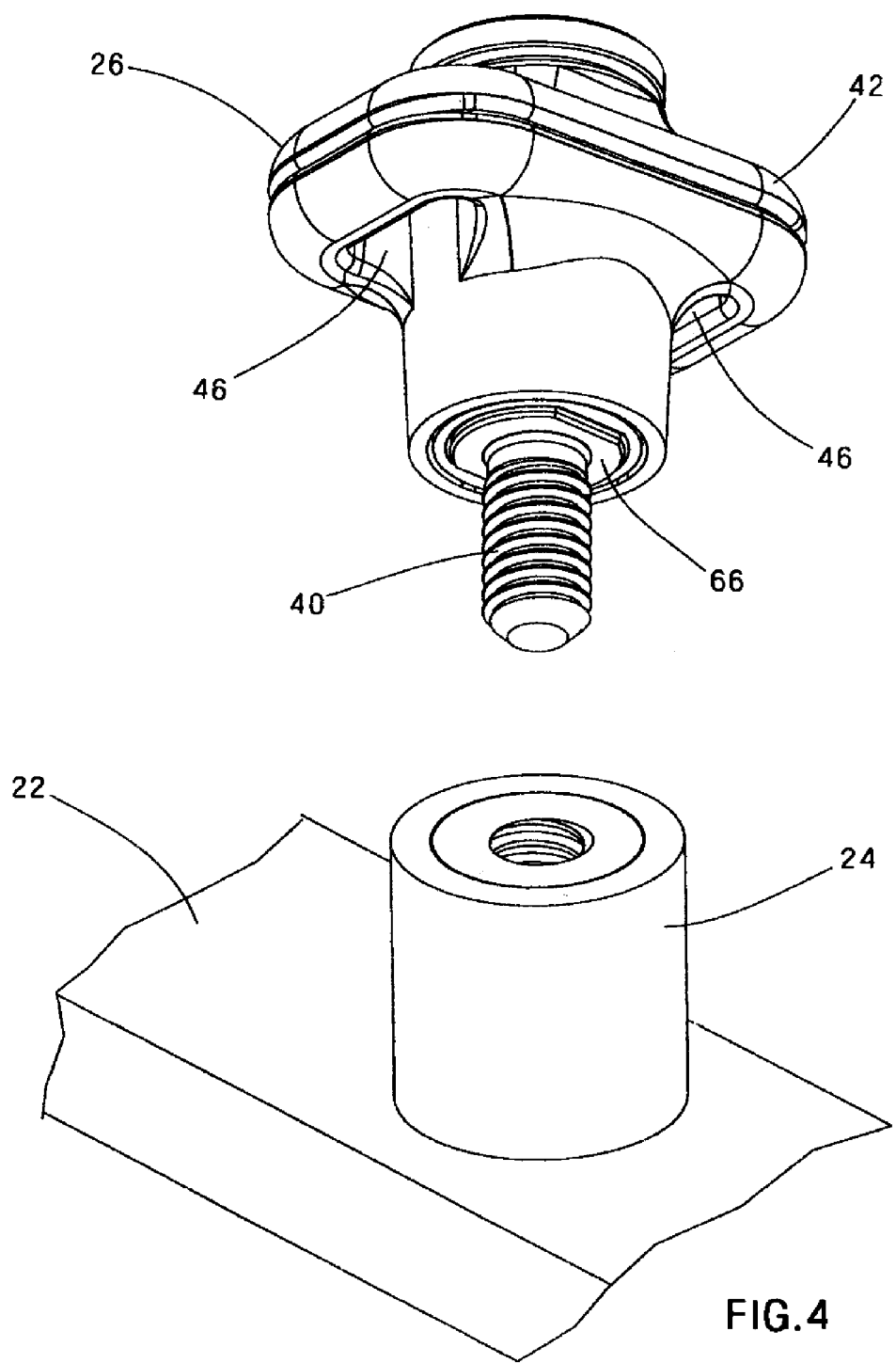
FIG. 4 is a bottom front perspective view of the first mount utilized in the stackable mount assembly of FIG. 1.
Figure 5:
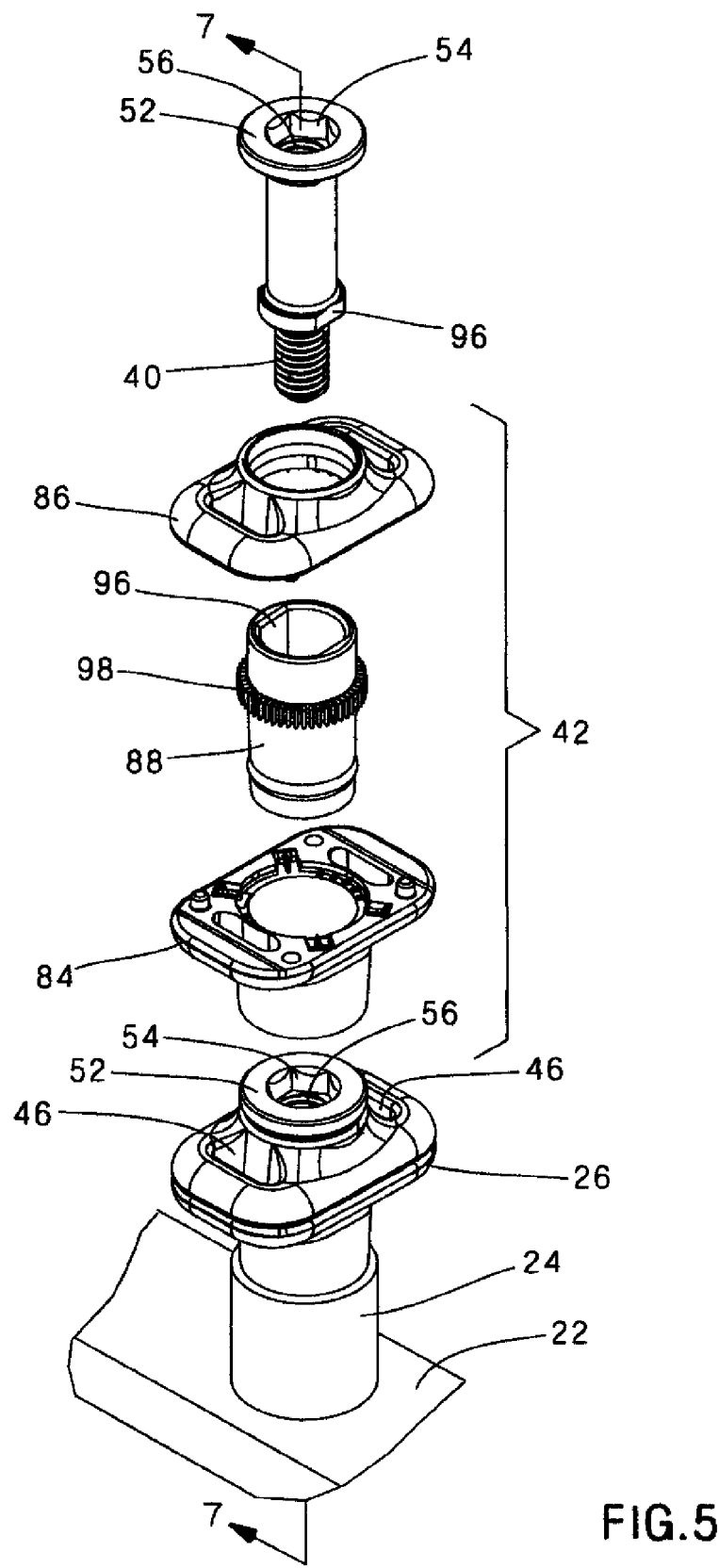
FIG. 5 is an exploded top perspective view of the mount of FIG. 3, shown positioned above a first mount secured to a mounting structure.

FIGS. 3-4 show the first mount 26 prior to attachment to the mounting structure 22, and FIG. 5 shows the first mount 26 after attachment to the mounting structure 22. The first mount 26 includes a fastener 40 snap-fitted within a hub assembly 42. Preferably, the fastener 40 is a threaded fastener made of titanium, and the hub assembly 42 is made of plastic. The titanium fastener 40 is lighter than a fastener having a steel socket and a titanium stud, and thus provides a weight advantage over existing mounts. Similarly, each of the second mount 28 and the third mount 30 includes a fastener snap-fitted within a hub assembly.

Figure 7:
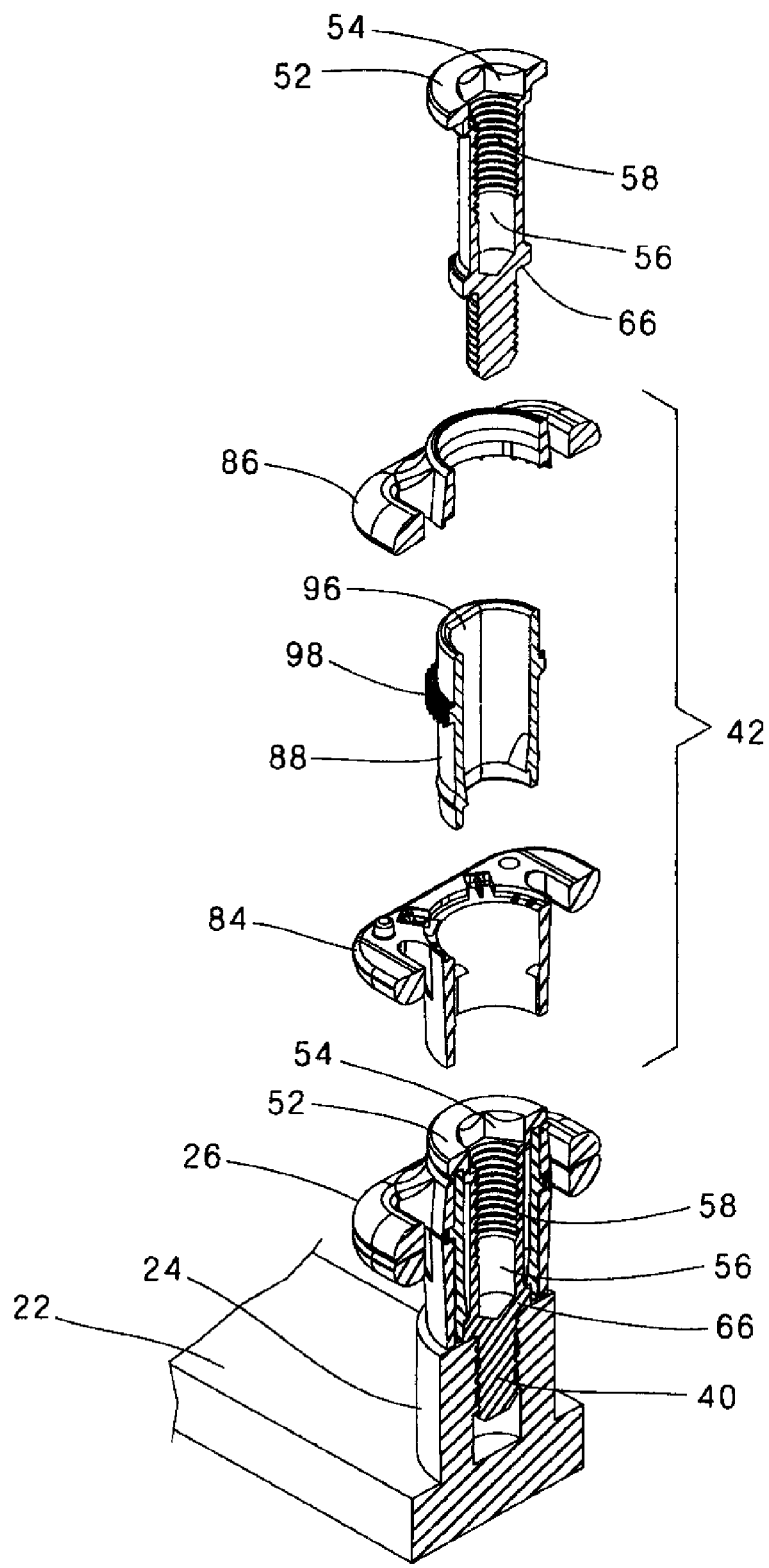
FIG. 7 is a cross-sectional view taken along lines 7-7 of FIG. 5.

As best seen in FIG. 7, the fastener 40 includes a head 52 and a shoulder 66, which retain the hub assembly 42. The head 52 includes a hex pocket 54 for receiving an allen head tool (not shown) utilized to tighten the first mount 26 to the mounting structure 22. An aperture 56 runs down the primary axis of the fastener 40, and the fastener 40 has internal threads 58 to facilitate engagement with a stud 60 of a fastener 62 protruding from the second mount 28, as shown in FIG. 7.

Figure 8:
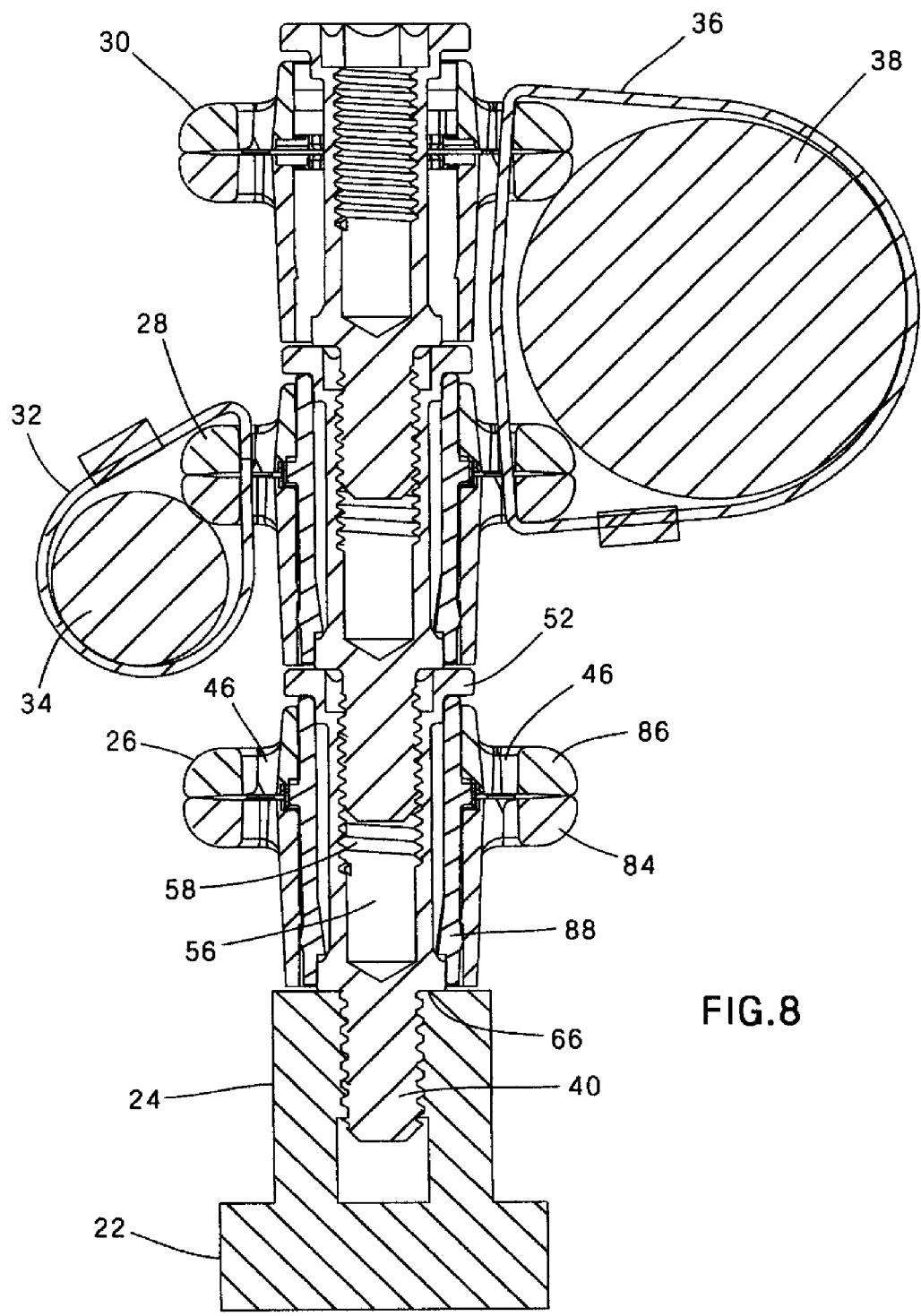
FIG. 8 is a cross-sectional view taken along lines 8-8 of FIG. 1.

As best seen in FIG. 8, the shoulder 66 of the fastener 40 extends just below the bottom of the hub assembly 42 so as to allow rotation and/or indexing of the hub assembly 42 and/or the components thereof after the fastener 40 is torqued down to the mounting structure 22. Alternatively, the shoulder 66 may be even with the bottom of the hub assembly 42, while still allowing rotation and/or indexing of the hub assembly 42 and/or the components thereof after the fastener 40 is torqued down to the mounting structure 22.

Figures 11, 12:
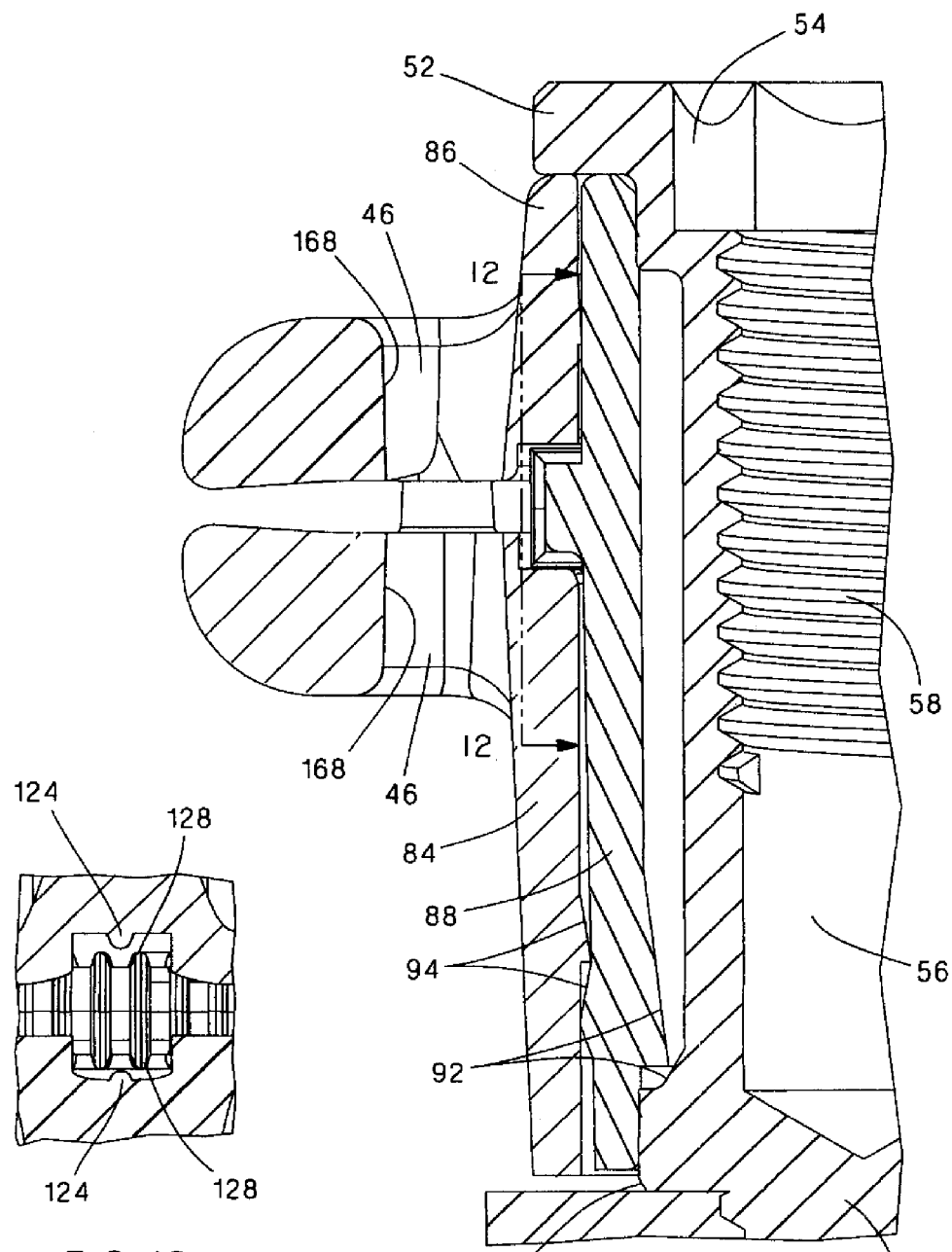
FIG. 11 is an enlarged view of FIG. 10, showing the locking teeth.
FIG. 12 is a cross-sectional view taken along lines 12-12 of FIG. 11, showing the locking teeth.
Figure 13:
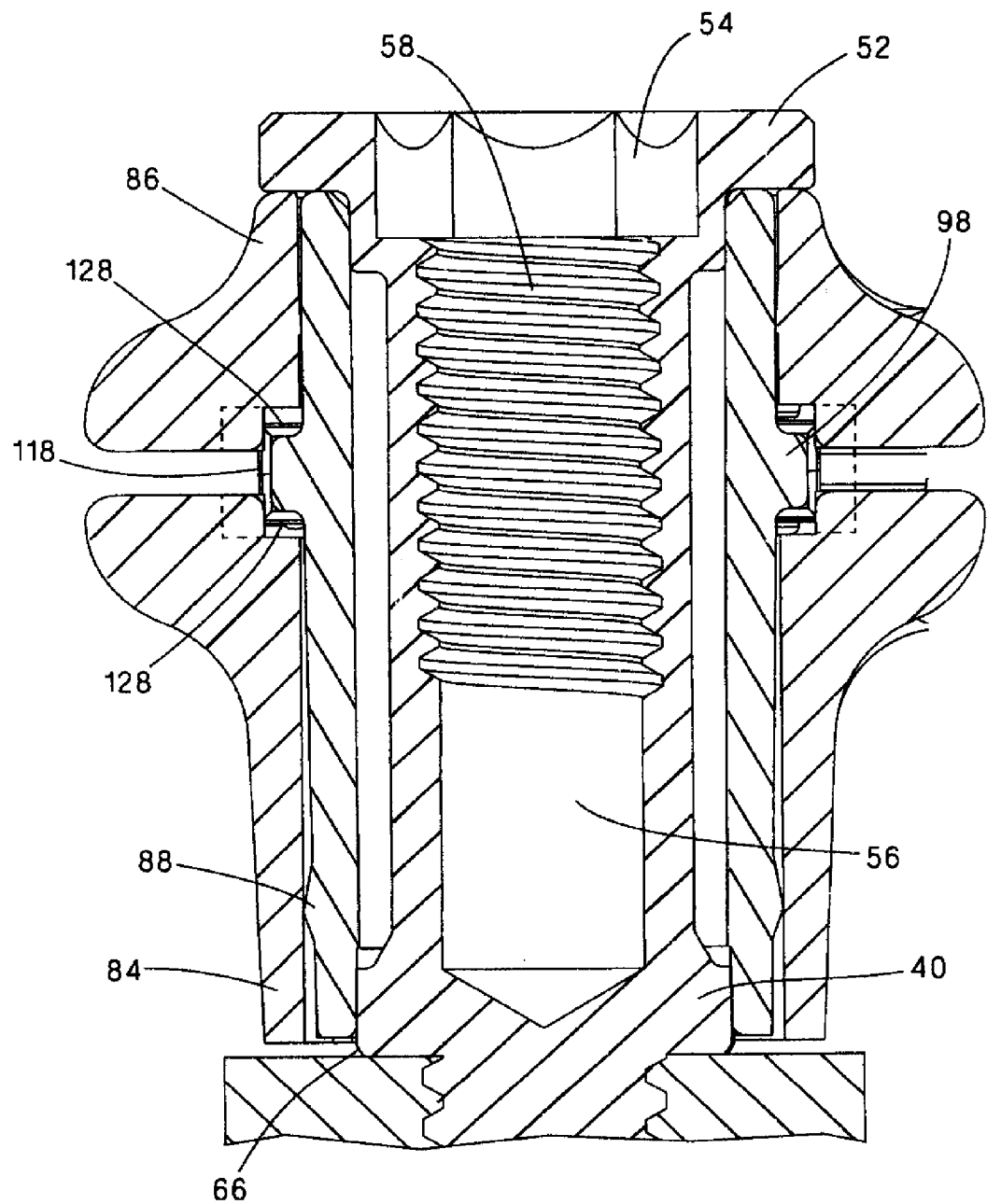
FIG. 13 is a cross-sectional view taken along lines 13-13 of FIG. 9.
Figures 14, 15:
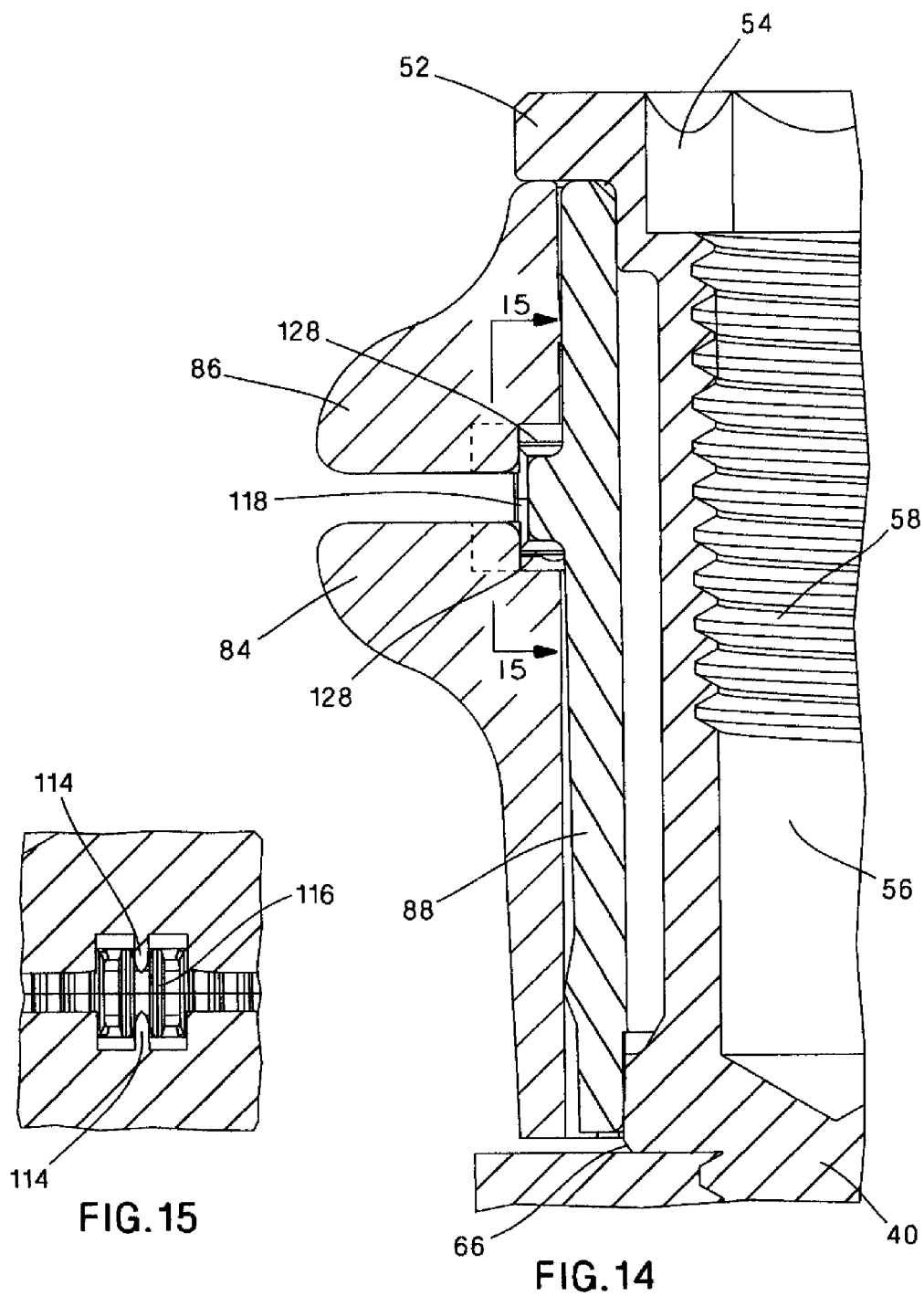
FIG. 14 is an enlarged view of FIG. 13, showing the indexing teeth.
FIG. 15 is a cross-sectional view taken along lines 15-15 of FIG. 14, showing the indexing teeth.

As shown in FIGS. 5-9, the hub assembly 42 includes a first rung component 84, a second rung component 86, and a sleeve 88. The rung components 84, 86 encapsulate the sleeve 88 to form the hub assembly 42. As described above, the fastener 40 is snap-fitted within the hub assembly 42. More particularly, the sleeve 88 is rotatably connected to the fastener 40 via snap-fit features 92, as best seen in FIG. 11. However, the sleeve 88 and the fastener 40 include flats 96, which prevent the sleeve 88 from rotating about the fastener 40.

The rung components 84, 86 are adapted to rotate about the longitudinal axis of the sleeve 88. The first rung component 84 is rotatably connected to one end of the sleeve 88, and is supported by snap-fit features 94 on the first rung component 84 and the sleeve 88, as best seen in FIG. 11. The second rung component 86 is rotatably connected to the other end of the sleeve 88, and is supported by a circumferential rib 98 on the sleeve 88, as best seen in FIG. 7.

Figure 6:
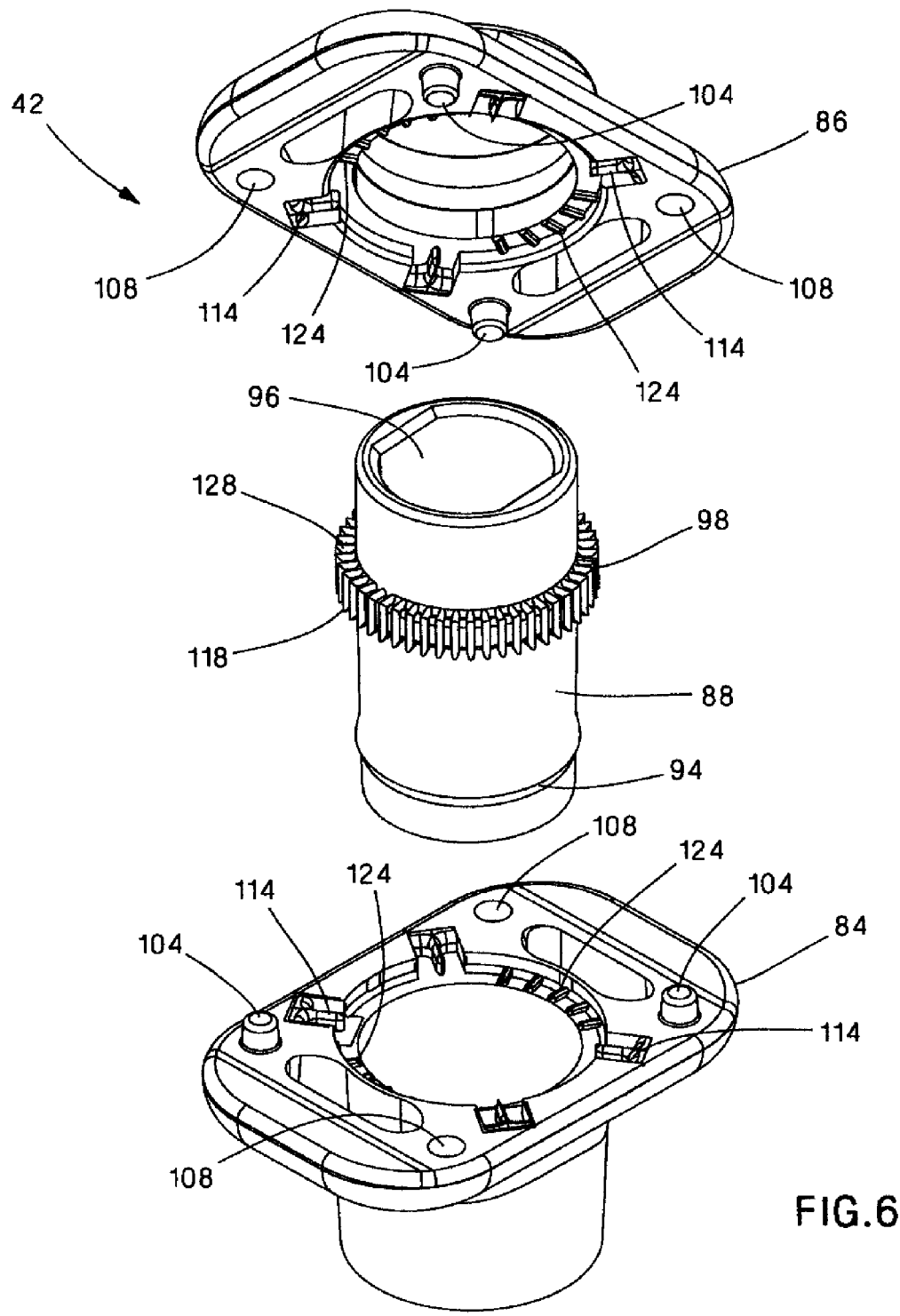
FIG. 6 is an enlarged view of FIG. 5, showing the hub assembly.

As best seen in FIG. 6, the rung components 84, 86 include alignment features, such as tapered bosses 104 and pockets 108. The alignment features prevent the rung components 84, 86 from rotating independently about the sleeve 88. As an example, the tapered bosses 104 on the first rung component 84 engage the corresponding pockets 108 on the second rung component 86, and similarly, the tapered bosses 104 on the second rung component 86 engage the corresponding pockets 108 on the first rung component 84, thereby preventing the rung components 84, 86 from rotating independently about the sleeve 88.

As best seen in FIG. 6, the rung components 84, 86 and the sleeve 88 include indexing teeth 114 and 118, respectively. As best seen in FIGS. 13-16, the indexing teeth 114 on the rung components 84, 86 engage the corresponding indexing teeth 118 on the sleeve 88, thereby preventing the rung components 84, 86 from freely rotating about the sleeve 88, but allowing the rung components 84, 86 to index or rotate about the sleeve 88 at an index angle, for example, 7.5°, 15°, 30°, 45°, 90°, 180°, or 360°. The index angle is determined based at least in part on the number of and/or spacing between the indexing teeth 114, 118, and may vary between 0° and 360°.

As best seen in FIG. 6, the rung components 84, 86 and the sleeve 88 include locking teeth 124 and 128, respectively. When a wire bundle, such as the first wire bundle 34 or the second wire bundle 38, is secured to the hub assembly 42 using a cable tie, such as the first cable tie 32 or the second cable tie 36, the locking teeth 124 on the rung components 84, 86 may engage the corresponding locking teeth 128 on the sleeve 88, thereby preventing the rung components 84, 86 from rotating and/or indexing about the sleeve 88, and thus, locking the hub assembly 42 in a desired position and/or orientation.

Figure 10:
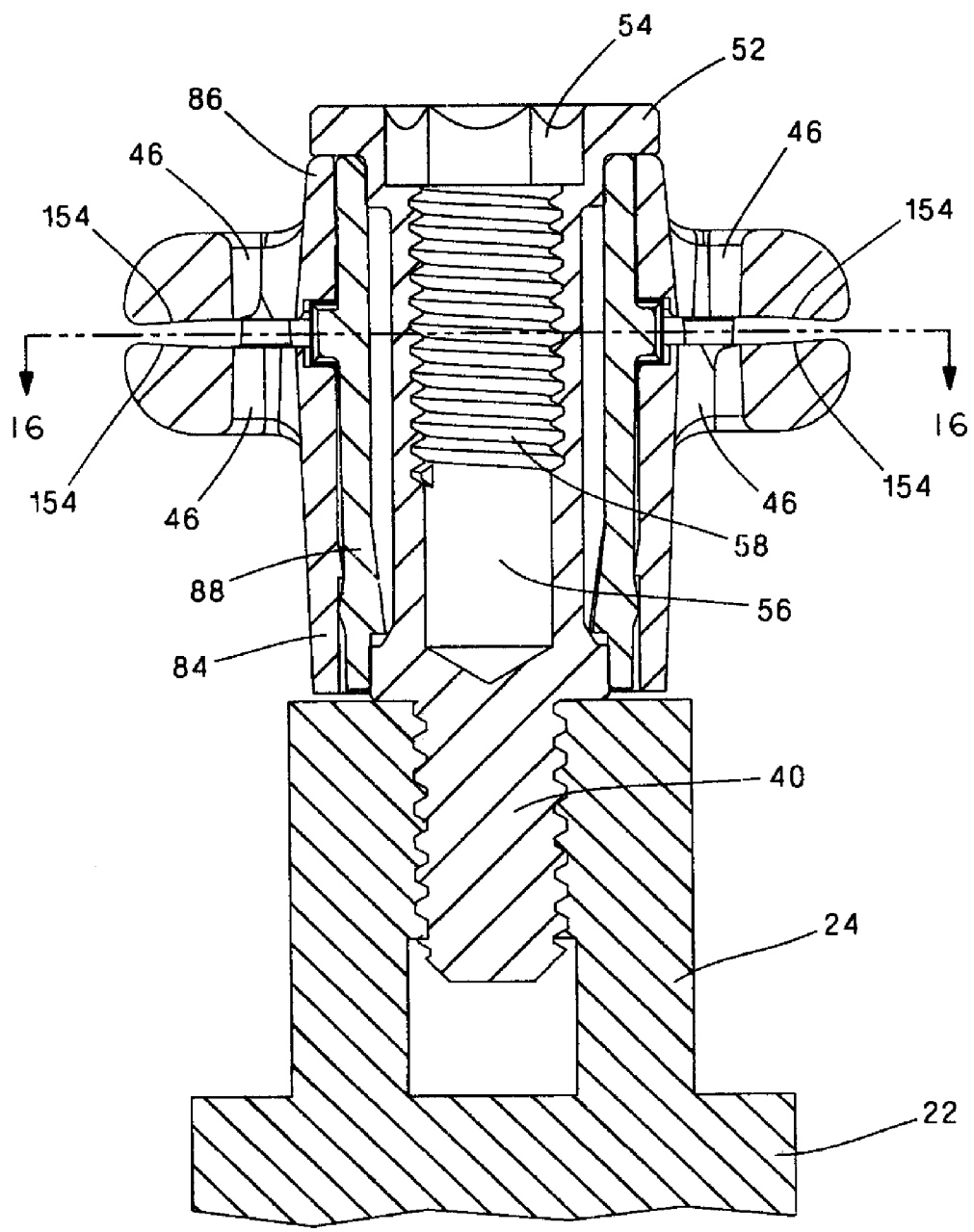
FIG. 10 is a cross-sectional view taken along lines 10-10 of FIG. 9, showing the mount in an "open" position.

The interior surfaces 154 of the rung components 84, 86 may be curved, as best seen in FIG. 10, to shift the point of contact between the rung components 84, 86 closest to the rungs 46 and cable ties 32, 36, which may enhance the engagement force applied to the locking teeth 124, 128.

Clearance exists within the hub assembly 42 and/or between the fastener 40 and the hub assembly 42 to allow the rung components 84, 86 to translate or float along the longitudinal axis of the sleeve 88, thereby preventing the locking teeth 124 on the rung components 84, 86 from engaging the locking teeth 128 on the sleeve 88, and thus, allowing the rung components 84, 86 to rotate and/or index about the sleeve 88.

Figure 19:
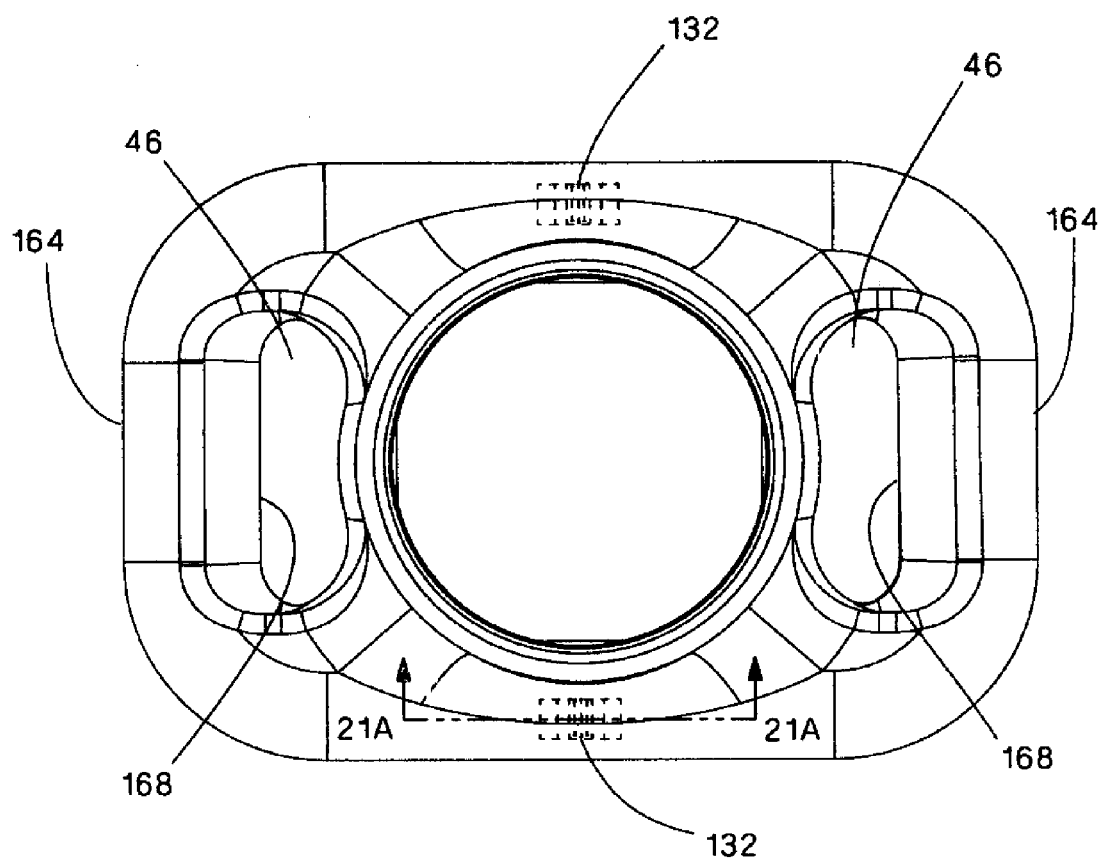
FIG. 19 is a top view of the mount of FIG. 3, showing the optional spring arms.
Figure 20:
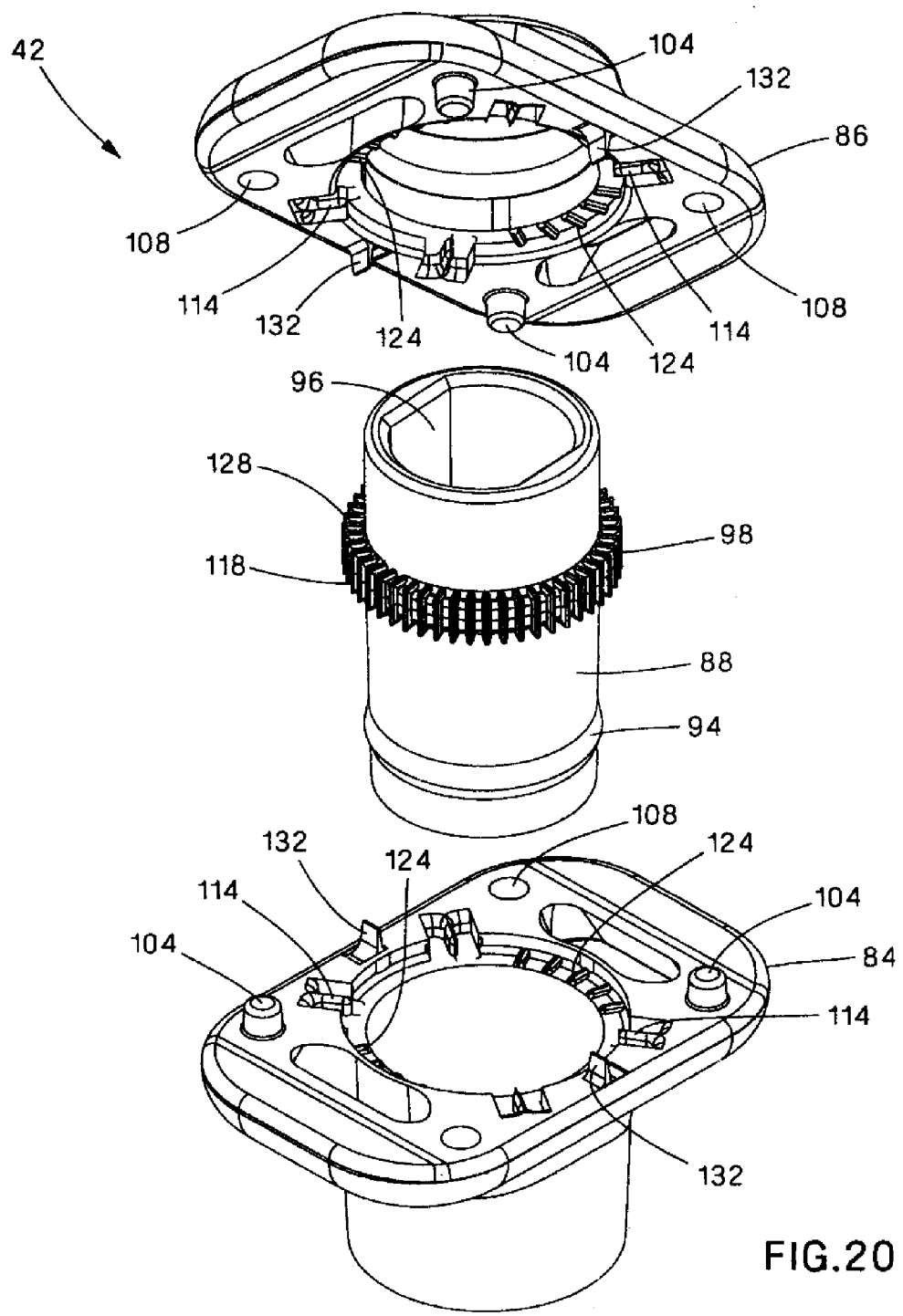
FIG. 20 is an enlarged view of FIG. 5, showing the optional spring arms.
Figure 21A:
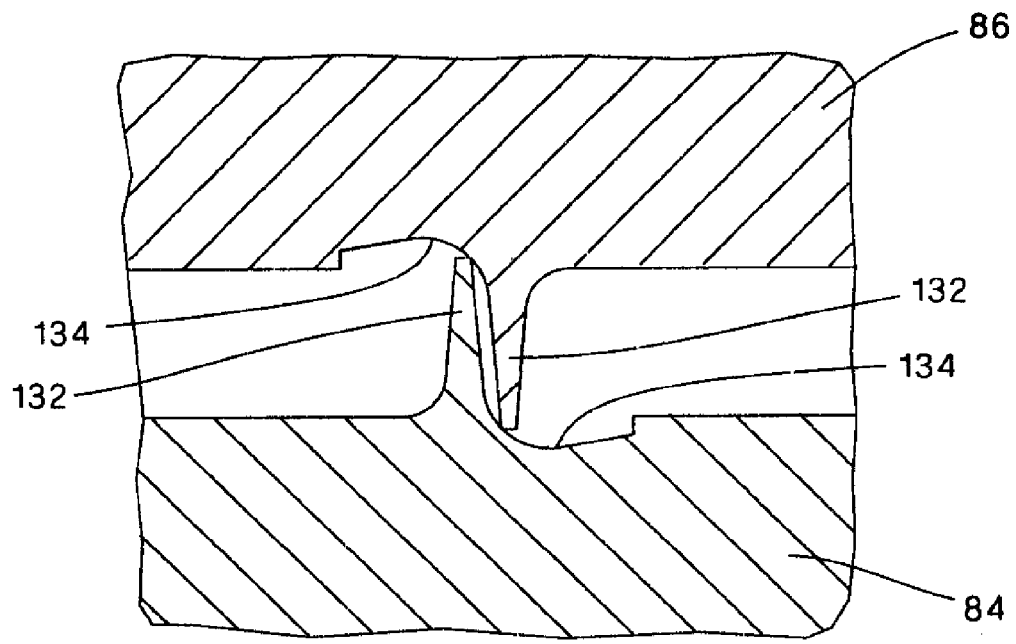
FIGS. 21A-B are cross-section views taken along lines 21-21 of FIG. 19, showing the optional spring arms collapsing into shallow pockets.
Figure 21B:
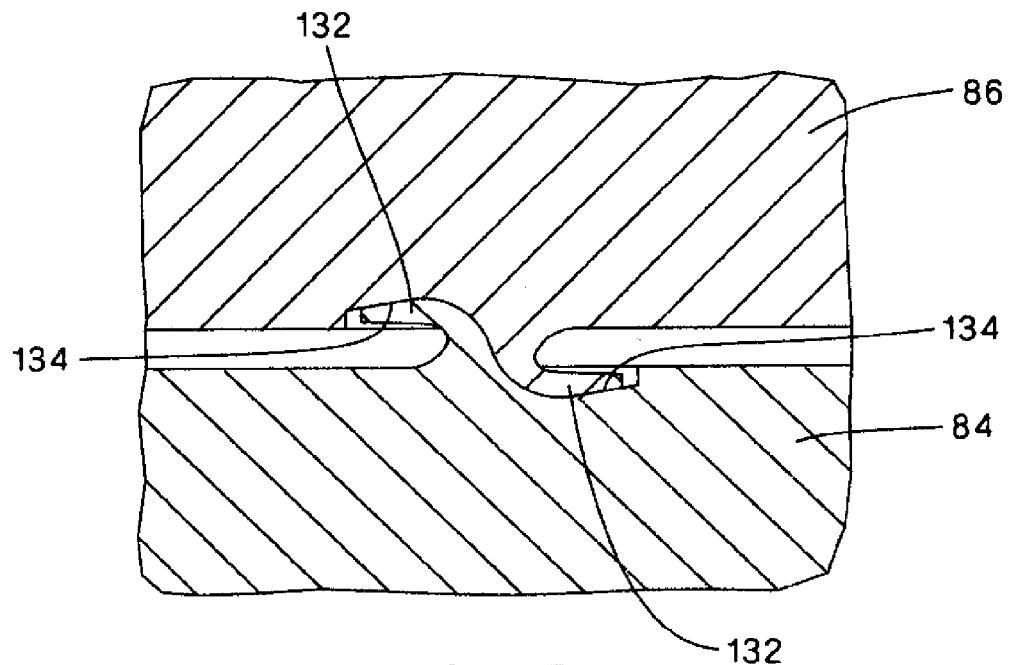
Figure 22A:
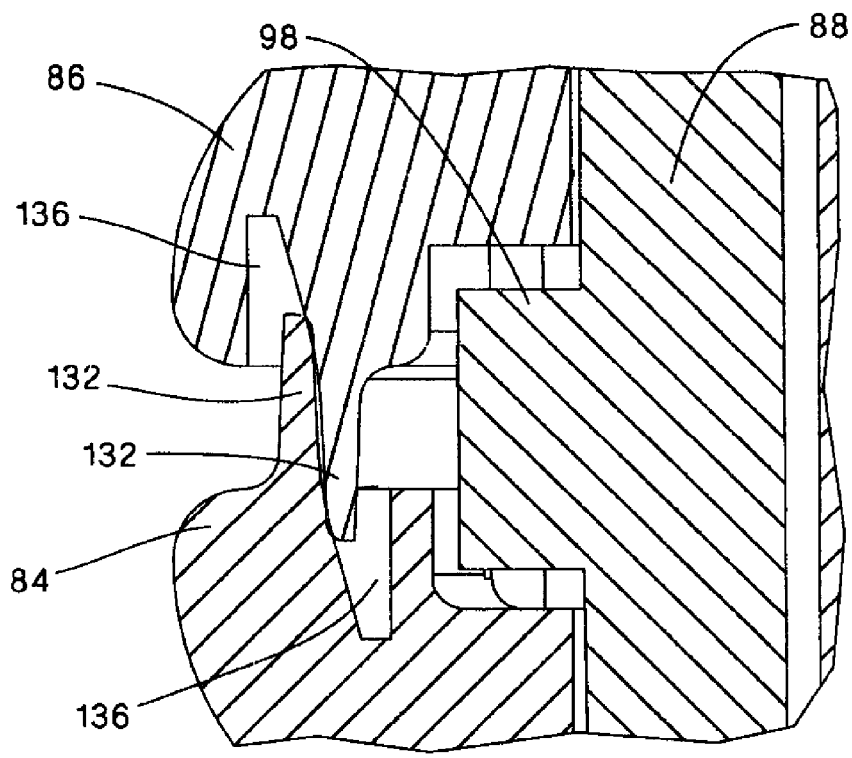
FIGS. 22A-B are cross-section views similar to FIGS. 21A-B, showing the optional spring arms collapsing into deep pockets.
Figure 22B:
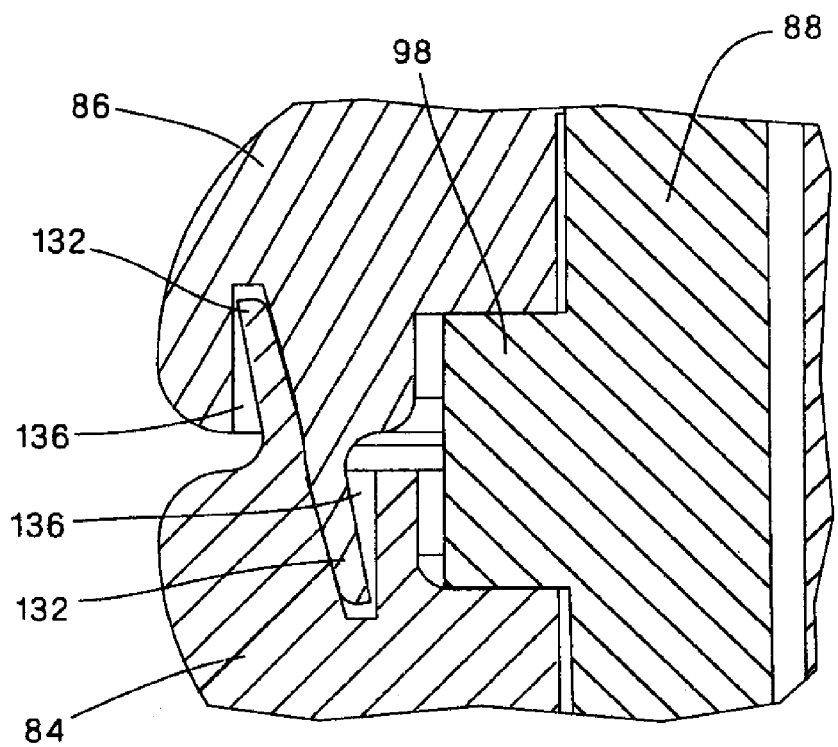

There is a tendency for the locking teeth 124 on the rung components 84, 86 to engage the locking teeth 128 on the sleeve due to gravity. As best seen in FIGS. 19-20, the rung components 84, 86 may include optional spring arms 132 to separate the rung components 84, 86. The optional spring arms 132 prevent the locking teeth 124 on the rung components 84, 86 from engaging the locking teeth 128 on the sleeve, thereby allowing the rung components 84, 86 to rotate and/or index about the sleeve 88, as described above. When a wire bundle, such as the first wire bundle 34 or the second wire bundle 38, is secured to the hub assembly 42 using a cable tie, such as the first cable tie 32 or the second cable tie 36, the spring arms 132 may collapse into shallow pockets 134, as best seen in FIGS. 21A-B, and/or tapered pockets 136, as best seen in FIGS. 22A-B.

Figure 23:
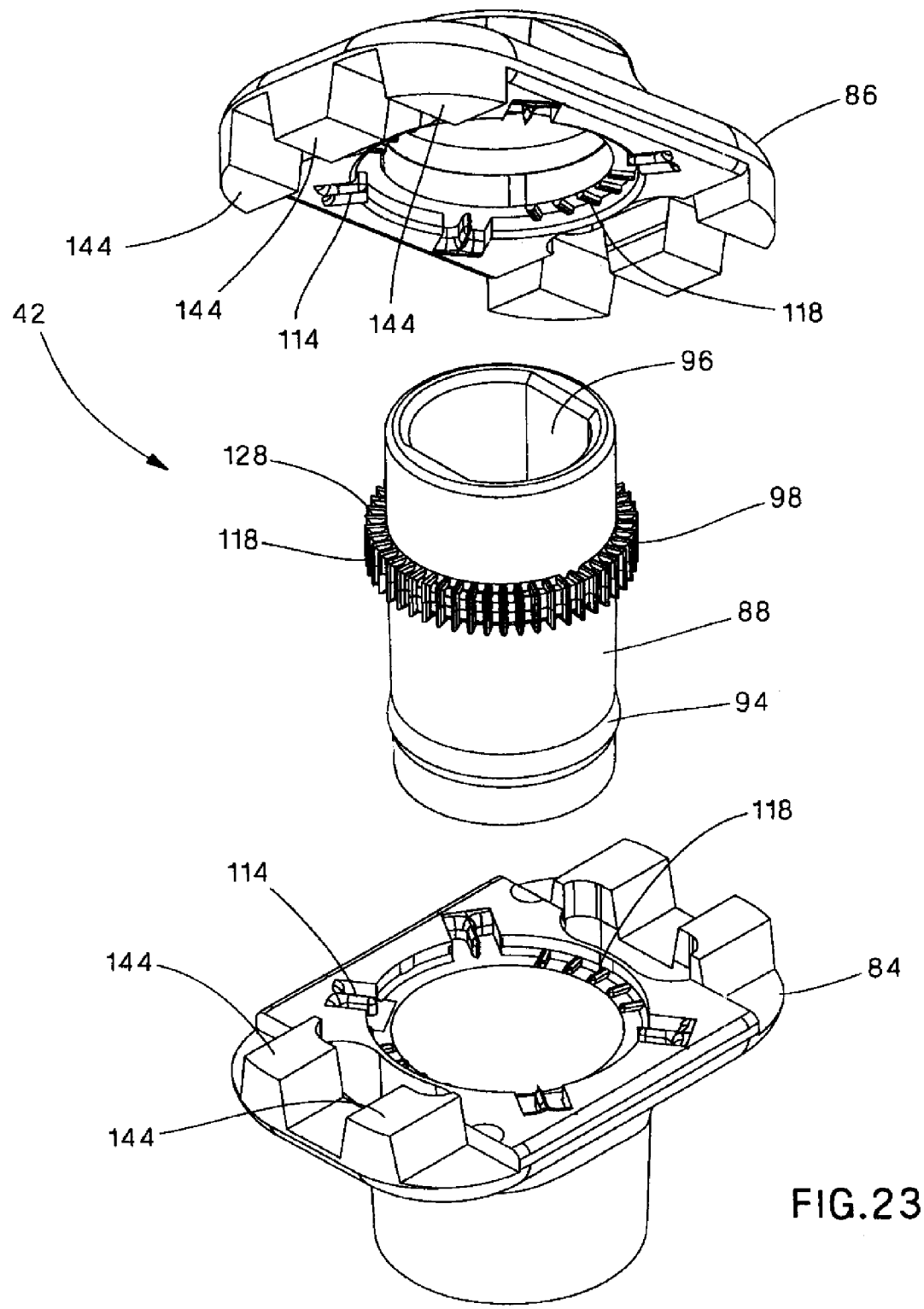
FIG. 23 is an enlarged view of FIG. 5, showing the optional rung teeth.
Figure 24A:
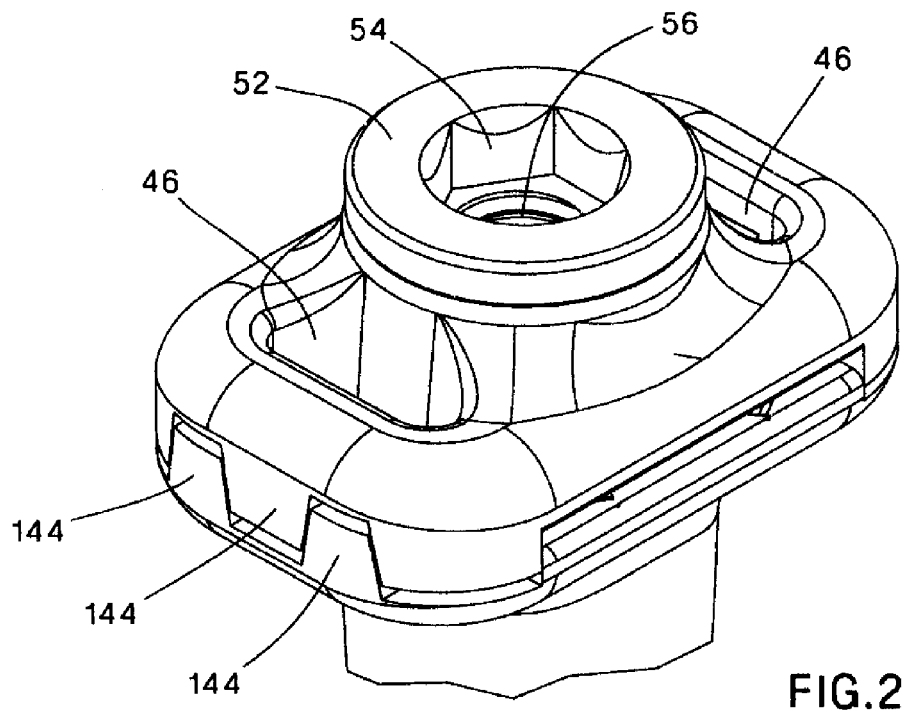
FIGS. 24A-B are top front perspective views of the first mount utilized in the stackable mount assembly of FIG. 1, showing the optional rung teeth in "open" and "closed" positions.
Figure 24B:
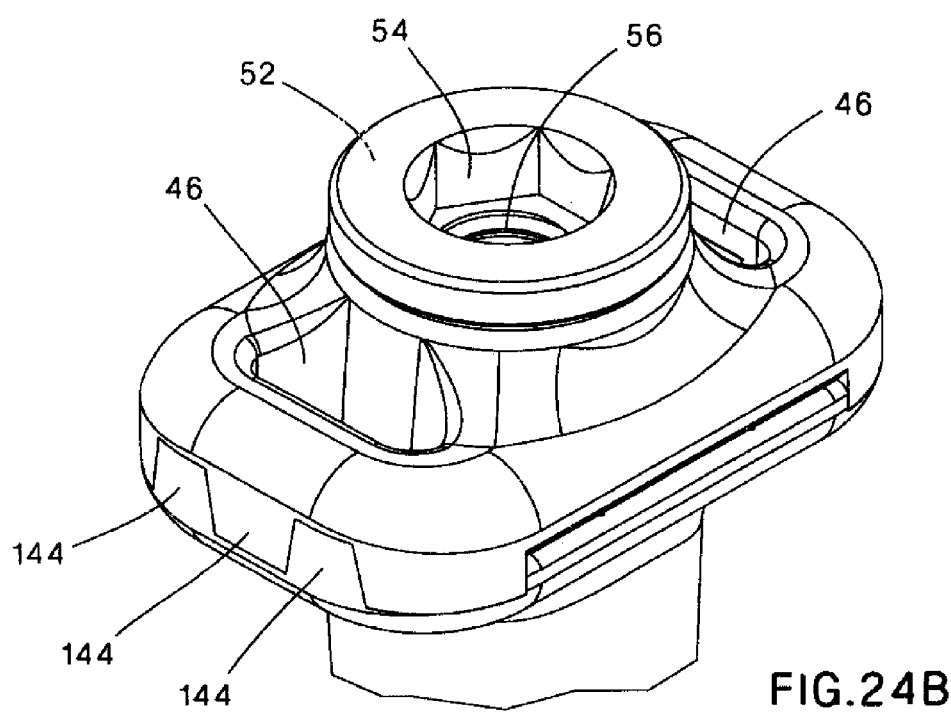

As shown in FIGS. 23-24, the rung components 84, 86 may include optional rung teeth 144. The rung teeth 144 are adapted to at least partially cover the gap between the rung components 84, 86 when the rung components 84, 86 are separated (e.g., when the rung components 84, 86 are not bound together by a cable tie, such as the first cable tie 32 or the second cable tie 36), thereby preventing wires or other objects from getting caught between the rung components 84, 86, which could damage the wires and/or cause a potential safety hazard. Additionally, the rung teeth 144 may act as alignment features, thereby preventing the rung components 84, 86 from independently rotating and/or indexing about the sleeve 88.

Figure 9:
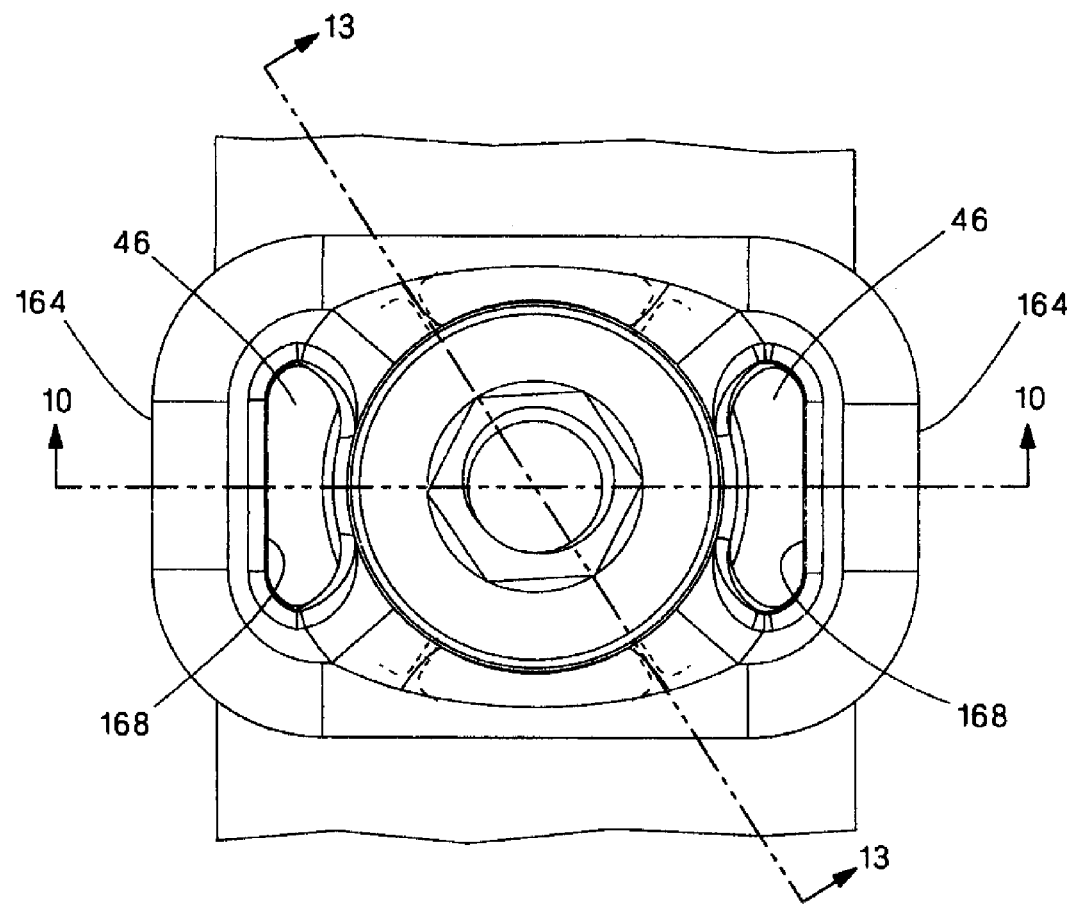
FIG. 9 is a top view of the mount of FIG. 3.

As best seen in FIG. 9, the hub assembly 42 includes two rungs 46, each adapted to receive one or more cable ties, such as cable ties 32, 36, for securing one or more wire bundles, such as wire bundles 34, 38. It is likewise contemplated that the hub assembly 42 may have any number of rungs 46, for example, three rungs, four rungs, six rungs, or eight rungs.

As best seen in FIG. 9, the outer edge 164 of the rungs 46 may be straight to more closely match the shape of the wire bundles 34, 38, and thus, provide more uniform loading on the wire bundles 34, 38, thereby reducing stress in the wire bundles 34, 38 at the point of attachment to the rungs 46.

The inner edge 168 of the rungs 46 may be straight, as best seen in FIG. 11. Alternatively, the inner edge 168 of the rungs 46 may be angled, as best seen in FIG. 19, and/or curved (not shown) to enhance the clamping force applied to the rung components 84, 86, and thus, the engagement force applied to the locking teeth 124, 128.

Figure 17:
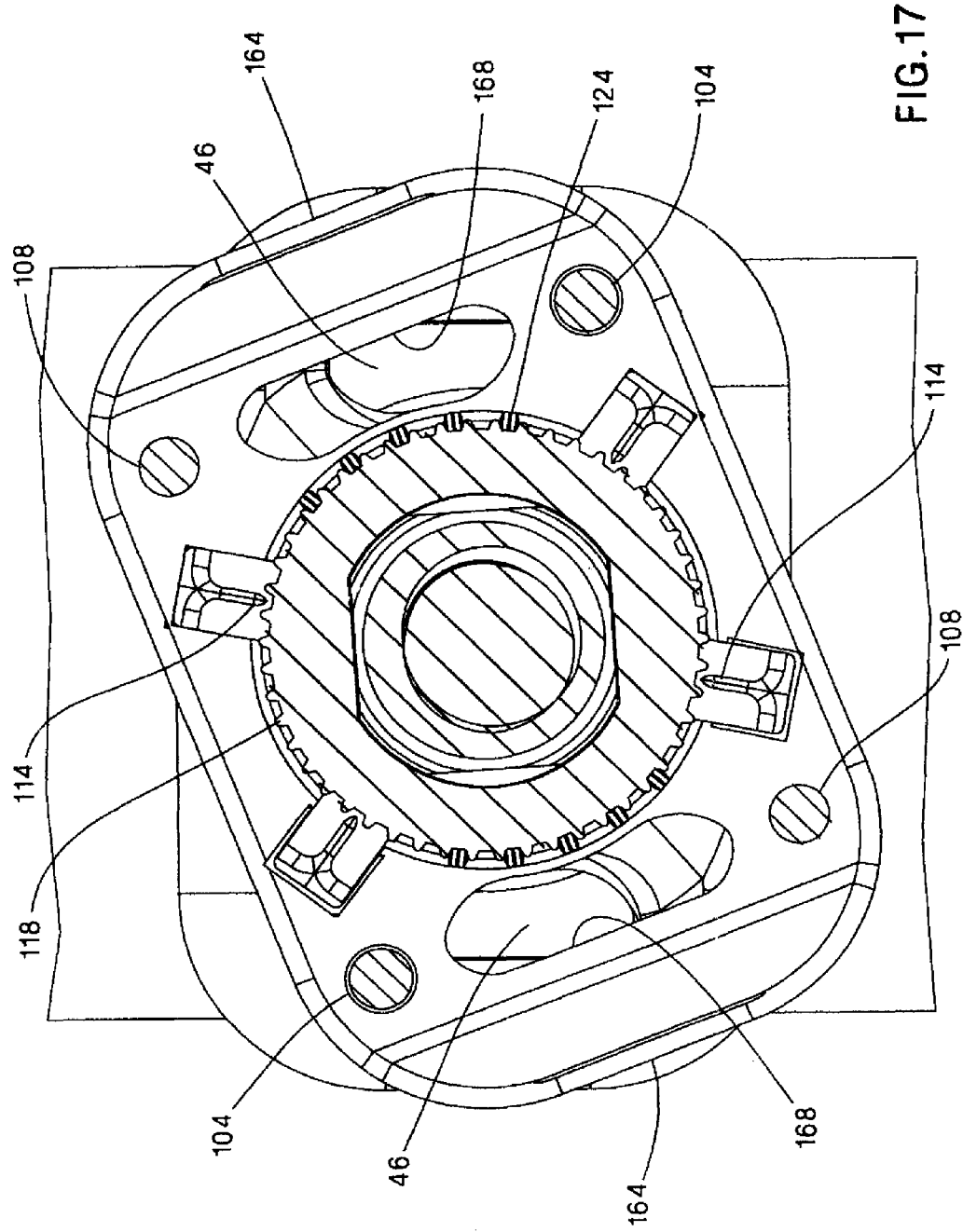
FIG. 17 is a cross-sectional view similar to FIG. 16, showing the rung components rotated counterclockwise about the sleeve.
Figure 18:
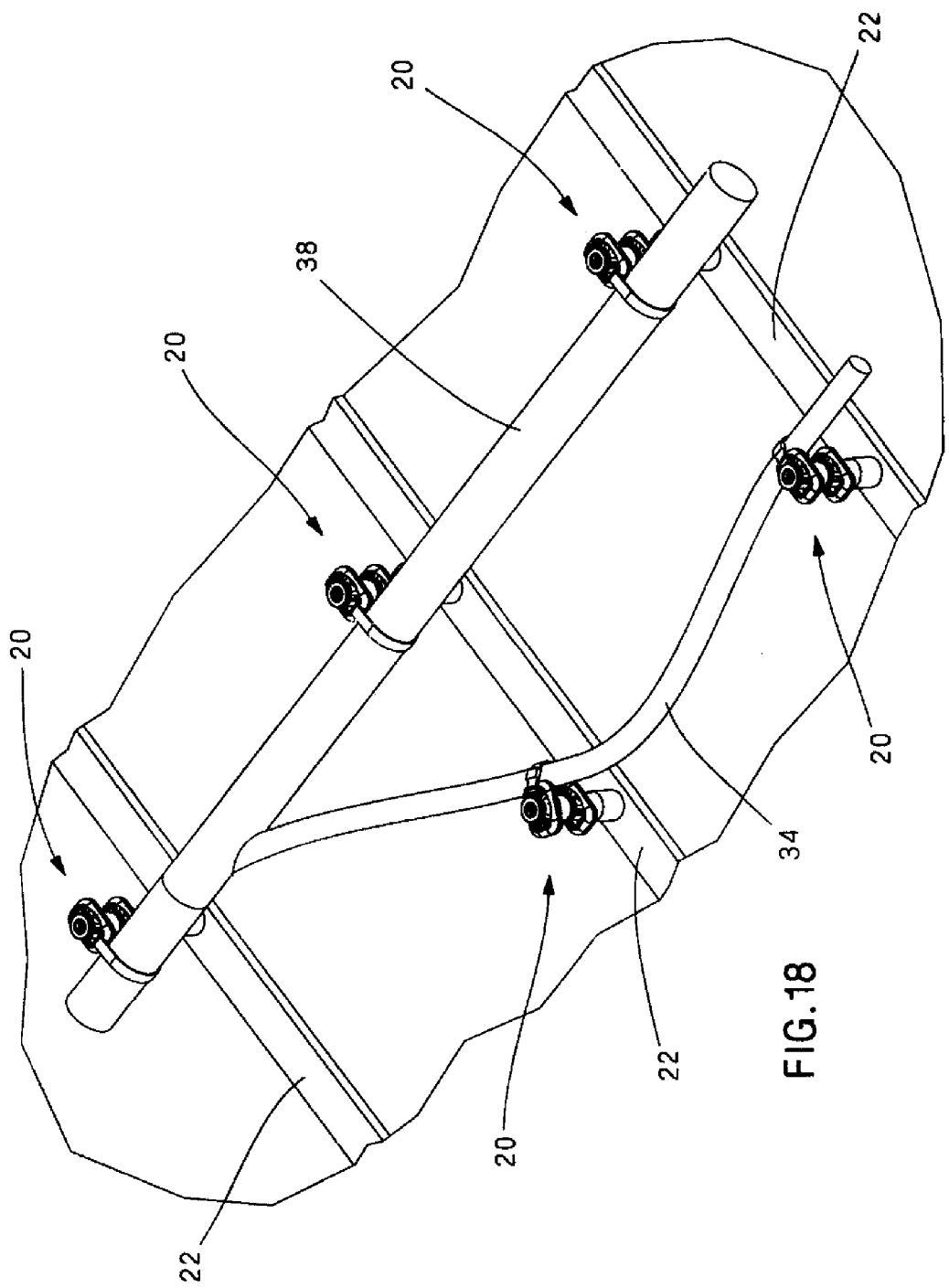
FIG. 18 is a top front perspective view of an exemplary wiring configuration, including a breakout.

As shown in FIGS. 17-18, the rungs 46 may be aligned in a variety of positions and/or orientations to accommodate a variety of wiring configurations, including horizontal and/or vertical breakouts.

FIGS. 25-26 illustrate a mount 200 according to an alternative embodiment of the present invention. Mount 200 is similar to mounts 26, 28, 30. That is, mount 200 includes fastener 210 and hub 220, which are similar to fastener 40 and hub assembly 42, respectively. Fastener 210 is snap-fitted within hub 220. Hub 220 is adapted to rotate about fastener 210. Mount 200 includes indexing features (e.g., indexing teeth 114, 118), which are described in more detail below. However, unlike mounts 26, 28, 30, mount 200 does not include locking features (e.g., locking teeth 124, 128).

The fastener 210 is similar to the fastener 40. That is, the fastener 210 includes head 211, shoulder 212, hex pocket 213, aperture 214, internal threads 215, and snap-fit features 230, which are similar to head 52, shoulder 66, hex pocket 54, aperture 56, internal threads 58, and snap-fit features 94, respectively. Unlike the fastener 40, the fastener 210 includes two ribs 216, which are described in more detail below. It is likewise contemplated that the fastener 210 may include any number of ribs 216.

The hub 220 is similar to the hub assembly 42. That is, the hub 220 includes two rungs 221 and snap-fit features 230 (e.g., a rib), which are similar to rungs 46 and rib 48, respectively. It is likewise contemplated that the hub 220 may include any number of rungs 221, for example, three rungs, four rungs, six rungs, or eight rungs. Unlike the hub assembly 42, which includes rung components 84, 86 and sleeve 88, the hub 220 is one piece and includes a plurality of slots 222, which are described in more detail below.

Similar to locking teeth 124, 128, ribs 216 on fastener 210 are adapted to engage slots 222 on hub 220, thereby preventing hub 220 from freely rotating about fastener 210, but allowing hub 220 to index or rotate about fastener 210 at an index angle, for example, 7.5°, 15°, 30°, 45°, 90°, 180°, or 360°. The index angle is determined based at least in part on the number of and/or spacing between the slots 222, and may vary between 0° and 360°.

Mount 200 is interchangeable with mounts 26, 28, 30, and may be attached to mounting structure 22, as well as additional mounts 200, to build a stackable mount assembly similar to stackable mount assembly 20, as described above.

The disclosed invention provides a stackable mount assembly that includes indexing and/or locking features. It should be noted that the above-described and illustrated embodiments and preferred embodiments of the invention are not an exhaustive listing of the forms such a stackable mount assembly in accordance with the invention might take; rather, they serve as exemplary and illustrative of embodiments of the invention as presently understood. By way of example, and without limitation, a stackable mount assembly having more than three mounts is contemplated to be within the scope of the invention. Many other forms of the invention are believed to exist.

The invention claimed is:

1. A hub assembly for a stackable mount, the hub assembly comprising:
   a sleeve having a first set of indexing teeth;
   a first rung component rotatably connected to a first end of the sleeve; and
   a second rung component rotatably connected to a second end sleeve,
   wherein at least one of the first rung component and the second rung component has a second set of indexing teeth,
   wherein the first set of indexing teeth and the second set of indexing teeth engage to allow the at least one rung component and the second rung component to indexically rotate about the sleeve at a desired angle of rotation.

2. The hub assembly of claim 1, wherein the desired angle of rotation is less than 360 degrees.

3. The hub assembly of claim 1, wherein the sleeve has a first set of locking teeth, wherein the at least one the first rung component and the second rung component has a second set of locking teeth, and wherein the first set of locking teeth and the second set of locking teeth engage to lock the at least one of the first rung component and the second rung component in a desired position and prevent further rotation of the at least one of the first rung component and the second rung component about the sleeve.

4. The hub assembly of claim 3, wherein the first set of locking teeth and the second set of locking teeth are engaged by securing a cable tie to the hub assembly.

5. The hub assembly of claim 1, wherein each of the first rung component and the second rung component has a plurality of rungs.

6. The hub assembly of claim 1, wherein each of the first rung component and the second rung component has at least one alignment feature for aligning the first rung component and the second rung component.

7. The hub assembly of claim 6, wherein at least alignment feature includes at least one of a projection, a pocket, and a set of rung teeth.

8. The hub assembly of claim 1, wherein at least one of the first rung component and the second rung component has at least one spring arm for spacing apart the first rung component and the second rung component and forming a gap therebetween.

9. The hub assembly of claim 8, wherein the at least one spring arm collapses into a pocket when a cable tie is secured to the hub assembly.

10. The hub assembly of claim 8, wherein each of the first rung component and the second rung component includes a set of rung teeth closing the gap between the first rung component and the second rung component.

11. The hub assembly of claim 1, wherein the sleeve is adapted to be connected to a fastener to form a stackable mount.

12. The hub assembly of claim 1, wherein the sleeve is adapted to be integrally formed with a fastener to form a stackable mount.

13. The hub assembly of claim 1, wherein the sleeve is adapted to be rotatably connected to a fastener to form a stackable mount, each of the sleeve and the fastener having a flat to prevent the sleeve from rotating about the fastener.

14. A hub assembly for a stackable mount, the hub assembly comprising:
   a sleeve having a first set of locking teeth;
   a first rung component rotatably connected to a first end of the sleeve; and
   a second rung component rotatably connected to a second end of the sleeve,
   wherein at least one of the first rung component and the second rung component has a second set of locking teeth,
   wherein the first set of locking teeth and the second set of locking teeth engage to lock the at least one of the first rung component and the second rung component in a desired position and prevent further rotation of the at least one of the first rung component and the second rung component about the sleeve.

15. The hub assembly of claim 14, wherein the first set of locking teeth and the second set of locking teeth are engaged by securing a cable tie to the hub assembly.

16. A stackable mount for a stackable mount assembly, the stackable mount comprising:
   a fastener having at least one rib; and
   a hub rotatably connected to the fastener, the hub having a plurality of slots for receiving the at least one rib,
   wherein the at least one rib and the plurality of slots engage to allow the hub to indexically rotate about the fastener at a desired angle of rotation,
   wherein the fastener of the stackable mount is adapted to be connected to a second fastener of a second stackable mount to form the stackable mount assembly.

17. The stackable mount of claim 16, wherein the hub has a plurality of rungs, each of the plurality of rungs for receiving at least one cable tie.

18. The stackable mount of claim 16, wherein the fastener includes one or more external threads for engaging one or more internal threads on the second fastener.

19. The stackable mount of claim 16, wherein the fastener includes one or more internal threads for engaging one or more external threads on the second fastener.

20. The stackable mount of claim 19, wherein the fastener includes one or more external threads for engaging one or more internal threads on at least one of a base of a mounting structure and a third fastener of a third stackable mount.

* * * * *